US009087059B2

(12) United States Patent
Petrou et al.

(10) Patent No.: US 9,087,059 B2
(45) Date of Patent: Jul. 21, 2015

(54) USER INTERFACE FOR PRESENTING SEARCH RESULTS FOR MULTIPLE REGIONS OF A VISUAL QUERY

(75) Inventors: David Petrou, Brooklyn, NY (US); Theodore Power, Brooklyn, NY (US)

(73) Assignee: GOOGLE INC., Mountain View, CA (US)

( * ) Notice: Subject to any disclaimer, the term of this patent is extended or adjusted under 35 U.S.C. 154(b) by 137 days.

(21) Appl. No.: 12/850,513

(22) Filed: Aug. 4, 2010

(65) Prior Publication Data

US 2011/0035406 A1    Feb. 10, 2011

Related U.S. Application Data

(60) Provisional application No. 61/266,122, filed on Dec. 2, 2009, provisional application No. 61/232,397, filed on Aug. 7, 2009.

(51) Int. Cl.
*G06F 17/30* (2006.01)

(52) U.S. Cl.
CPC ...... *G06F 17/3005* (2013.01); *G06F 17/30047* (2013.01)

(58) Field of Classification Search
USPC ......... 707/706, 722, 736, 758, 759, 764, 765, 707/766, 769, 781, 999.002, 3, 5
See application file for complete search history.

(56) References Cited

U.S. PATENT DOCUMENTS

| | | | |
|---|---|---|---|
| 4,888,690 A | 12/1989 | Huber | 364/200 |
| 4,899,292 A | 2/1990 | Montagna et al. | 364/521 |
| 5,475,819 A | 12/1995 | Miller et al. | 395/200.03 |
| 5,544,051 A | 8/1996 | Senn et al. | 364/419.19 |
| 5,560,005 A | 9/1996 | Hoover et al. | 395/600 |
| 5,574,898 A | 11/1996 | Leblang et al. | 395/601 |
| 5,615,384 A | 3/1997 | Allard et al. | |
| 5,764,799 A | 6/1998 | Hong et al. | |

(Continued)

FOREIGN PATENT DOCUMENTS

| | | | |
|---|---|---|---|
| CN | 101375281 A | 2/2009 | |
| DE | 10245900 A1 | 4/2004 | G06K 9/62 |

(Continued)

OTHER PUBLICATIONS

International Search Report and Written Opinion for PCT/US2010/044604 dated Oct. 6, 2010.

(Continued)

*Primary Examiner* — Syling Yen
(74) *Attorney, Agent, or Firm* — Fish & Richardson P.C.

(57) ABSTRACT

A visual query such as a photograph, screen shot, scanned image, or video frame is submitted to a visual query search system from a client system. The search system processes the visual query by sending it to a plurality of parallel search systems, each implementing a distinct visual query search process. A plurality of results is received from the parallel search systems. Utilizing the search results, an interactive results document is created and sent to the client system. The interactive results document has at least one visual identifier for a sub-portion of the visual query with a selectable link to at least one search result for that sub-portion. The visual identifier may be a bounding box around the respective sub-portion, or a semi-transparent label over the respective sub-portion. Optionally, the bounding box or label is color coded by type of result.

20 Claims, 15 Drawing Sheets

(56) References Cited

U.S. PATENT DOCUMENTS

| | | | |
|---|---|---|---|
| 5,778,378 A | 7/1998 | Rubin | 707/103 |
| 5,815,415 A | 9/1998 | Bentley et al. | 364/578 |
| 5,832,479 A | 11/1998 | Berkowitz et al. | 707/3 |
| 5,870,739 A | 2/1999 | Davis, III et al. | 707/4 |
| 5,905,980 A | 5/1999 | Masuichi et al. | 707/1 |
| 5,946,692 A | 8/1999 | Faloutsos et al. | 707/101 |
| 5,963,940 A | 10/1999 | Liddy et al. | 707/5 |
| 6,006,221 A | 12/1999 | Liddy et al. | 707/5 |
| 6,014,661 A | 1/2000 | Ahlberg et al. | 707/3 |
| 6,026,388 A | 2/2000 | Liddy et al. | 707/1 |
| 6,029,195 A | 2/2000 | Herz | 709/219 |
| 6,101,515 A | 8/2000 | Wical et al. | 707/531 |
| 6,105,020 A | 8/2000 | Lindsay et al. | 707/2 |
| 6,105,030 A | 8/2000 | Syed et al. | 707/10 |
| 6,137,907 A | 10/2000 | Clark et al. | |
| 6,216,138 B1 | 4/2001 | Wells et al. | 707/502 |
| 6,222,540 B1 | 4/2001 | Sacerdoti | 345/339 |
| 6,263,328 B1 | 7/2001 | Coden et al. | 707/3 |
| 6,263,335 B1 | 7/2001 | Paik et al. | 707/5 |
| 6,304,864 B1 | 10/2001 | Liddy et al. | 706/15 |
| 6,311,189 B1 | 10/2001 | deVries et al. | 707/102 |
| 6,326,962 B1 | 12/2001 | Szabo | 345/348 |
| 6,327,574 B1 | 12/2001 | Kramer et al. | 705/14 |
| 6,363,179 B1 | 3/2002 | Evans et al. | 382/309 |
| 6,377,943 B1 | 4/2002 | Jakobsson | 707/2 |
| 6,408,293 B1 | 6/2002 | Aggarwal et al. | |
| 6,480,194 B1 | 11/2002 | Sang'udi et al. | 345/440 |
| 6,519,631 B1 | 2/2003 | Rosenschein et al. | 709/217 |
| 6,529,900 B1 | 3/2003 | Patterson et al. | 707/3 |
| 6,584,464 B1 | 6/2003 | Warthen | 707/4 |
| 6,606,659 B1 | 8/2003 | Hegli et al. | 709/225 |
| 6,609,123 B1 | 8/2003 | Cazemier et al. | 707/4 |
| 6,629,097 B1 | 9/2003 | Keith | 707/5 |
| 6,643,641 B1 | 11/2003 | Snyder | 707/4 |
| 6,718,324 B2 | 4/2004 | Edlund et al. | 707/5 |
| 6,832,218 B1 | 12/2004 | Emens et al. | 707/5 |
| 6,850,896 B1 | 2/2005 | Kelman et al. | 705/10 |
| 6,873,982 B1 | 3/2005 | Bates et al. | 707/5 |
| 6,885,990 B1 | 4/2005 | Ohmori et al. | 704/270 |
| 6,928,436 B2 | 8/2005 | Baudel | 707/6 |
| 6,961,723 B2 | 11/2005 | Faybishenko et al. | 707/3 |
| 6,968,343 B2 | 11/2005 | Charisius et al. | 707/102 |
| 7,013,308 B1 | 3/2006 | Tunstall-Pedoe | 707/104.1 |
| 7,031,955 B1 | 4/2006 | de Souza et al. | 707/3 |
| 7,043,521 B2 | 5/2006 | Eitel | 709/202 |
| 7,100,083 B2 | 8/2006 | Little et al. | 714/26 |
| 7,113,944 B2 | 9/2006 | Zhang et al. | |
| 7,146,538 B2 | 12/2006 | Johnson et al. | 714/30 |
| 7,158,983 B2 | 1/2007 | Willse et al. | 707/101 |
| 7,421,155 B2 | 9/2008 | King et al. | 382/312 |
| 7,668,405 B2 | 2/2010 | Gallagher | |
| 7,669,115 B2 | 2/2010 | Cho et al. | 715/212 |
| 7,917,514 B2 | 3/2011 | Lawler et al. | |
| 7,934,156 B2 | 4/2011 | Forstall et al. | |
| 8,452,794 B2 | 5/2013 | Yang et al. | |
| 8,489,589 B2 | 7/2013 | Mei et al. | |
| 2002/0055954 A1 | 5/2002 | Breuer | 707/507 |
| 2002/0065814 A1 | 5/2002 | Okamoto et al. | 707/3 |
| 2002/0065815 A1 | 5/2002 | Layden | 707/3 |
| 2002/0128818 A1 | 9/2002 | Ho et al. | 704/9 |
| 2002/0154175 A1 | 10/2002 | Abello et al. | 345/853 |
| 2002/0173984 A1 | 11/2002 | Robertson et al. | 705/1 |
| 2003/0005036 A1 | 1/2003 | Mitzenmacher | 709/203 |
| 2003/0065779 A1 | 4/2003 | Malik et al. | |
| 2003/0069880 A1 | 4/2003 | Harrison et al. | 707/3 |
| 2003/0097357 A1 | 5/2003 | Ferrari et al. | 707/3 |
| 2003/0115485 A1 | 6/2003 | Milliken | 713/201 |
| 2003/0120373 A1 | 6/2003 | Eames | 700/128 |
| 2003/0120644 A1 | 6/2003 | Shirota | 707/3 |
| 2003/0120654 A1 | 6/2003 | Edlund et al. | 707/7 |
| 2003/0120659 A1 | 6/2003 | Sridhar | 707/100 |
| 2003/0154071 A1 | 8/2003 | Shreve | 704/9 |
| 2003/0158855 A1 | 8/2003 | Farnham et al. | 707/102 |
| 2003/0195872 A1 | 10/2003 | Senn | 707/3 |
| 2003/0208665 A1 | 11/2003 | Peir et al. | 711/169 |
| 2003/0217052 A1 | 11/2003 | Rubenczyk et al. | 707/3 |
| 2004/0030731 A1 | 2/2004 | Iftode et al. | 707/205 |
| 2004/0107125 A1 | 6/2004 | Guheen et al. | 705/7 |
| 2004/0122844 A1 | 6/2004 | Malloy et al. | 707/102 |
| 2004/0125137 A1 | 7/2004 | Stata et al. | 345/764 |
| 2004/0167909 A1 | 8/2004 | Wakefield et al. | 707/100 |
| 2004/0220904 A1 | 11/2004 | Finlay et al. | 707/3 |
| 2004/0236655 A1 | 11/2004 | Scumniotales et al. | 705/36 |
| 2004/0255237 A1 | 12/2004 | Tong | 715/501.1 |
| 2004/0267700 A1 | 12/2004 | Dumais et al. | 707/2 |
| 2005/0022009 A1 | 1/2005 | Aguilera et al. | 713/201 |
| 2005/0033803 A1 | 2/2005 | Vleet et al. | 709/203 |
| 2005/0039033 A1 | 2/2005 | Meyers et al. | 713/193 |
| 2005/0050016 A1 | 3/2005 | Stanoi et al. | 707/3 |
| 2005/0055327 A1 | 3/2005 | Agrawal et al. | 707/1 |
| 2005/0057566 A1 | 3/2005 | Githens et al. | 345/440 |
| 2005/0060277 A1 | 3/2005 | Zlatanov et al. | 707/1 |
| 2005/0076012 A1 | 4/2005 | Manber et al. | 707/3 |
| 2005/0083413 A1 | 4/2005 | Reed et al. | 348/211.99 |
| 2005/0086224 A1 | 4/2005 | Franciosa et al. | |
| 2005/0086520 A1 | 4/2005 | Dharmapurikar et al. | 713/201 |
| 2005/0097131 A1 | 5/2005 | Benco et al. | 707/104.1 |
| 2005/0120004 A1 | 6/2005 | Stata et al. | 707/3 |
| 2005/0123200 A1 | 6/2005 | Myers et al. | |
| 2005/0162523 A1 | 7/2005 | Darrell et al. | |
| 2005/0187898 A1 | 8/2005 | Chazelle et al. | 707/1 |
| 2005/0216464 A1 | 9/2005 | Toyama et al. | 707/9 |
| 2005/0219929 A1 | 10/2005 | Navas | 365/212 |
| 2005/0256825 A1 | 11/2005 | Dettinger et al. | 707/1 |
| 2005/0268212 A1 | 12/2005 | Dagel | 715/500 |
| 2006/0004851 A1 | 1/2006 | Gold et al. | 707/103 X |
| 2006/0020582 A1 | 1/2006 | Dettinger et al. | 707/3 |
| 2006/0020630 A1 | 1/2006 | Stager et al. | 707/104.1 |
| 2006/0041543 A1 | 2/2006 | Achlioptas | |
| 2006/0047838 A1 | 3/2006 | Chauhan | 709/230 |
| 2006/0048059 A1 | 3/2006 | Etkin | |
| 2006/0085386 A1 | 4/2006 | Thanu et al. | 707/2 |
| 2006/0085465 A1 | 4/2006 | Nori et al. | 707/101 |
| 2006/0085477 A1 | 4/2006 | Phillips et al. | |
| 2006/0149700 A1 | 7/2006 | Gladish et al. | 707/1 |
| 2006/0150119 A1 | 7/2006 | Chesnais et al. | |
| 2006/0173824 A1 | 8/2006 | Bensky et al. | 707/3 |
| 2006/0193502 A1 | 8/2006 | Yamaguchi | 382/118 |
| 2006/0206508 A1 | 9/2006 | Colace et al. | 707/100 |
| 2006/0224582 A1 | 10/2006 | Hogue | 707/6 |
| 2006/0227992 A1 | 10/2006 | Rathus et al. | |
| 2006/0253491 A1* | 11/2006 | Gokturk et al. | 707/104.1 |
| 2007/0011149 A1 | 1/2007 | Walker | 707/4 |
| 2007/0022085 A1 | 1/2007 | Kulkarni | 707/1 |
| 2007/0055656 A1 | 3/2007 | Tunstall-Pedoe | 707/3 |
| 2007/0067108 A1 | 3/2007 | Buhler et al. | 702/19 |
| 2007/0086669 A1 | 4/2007 | Berger et al. | |
| 2007/0098303 A1 | 5/2007 | Gallagher et al. | |
| 2007/0106721 A1* | 5/2007 | Schloter | 709/200 |
| 2007/0143312 A1 | 6/2007 | Wiseman | |
| 2007/0179965 A1 | 8/2007 | Hogue et al. | 707/102 |
| 2007/0201749 A1 | 8/2007 | Yamauchi et al. | |
| 2007/0203867 A1 | 8/2007 | Hogue et al. | 706/48 |
| 2007/0203868 A1 | 8/2007 | Betz | 706/50 |
| 2007/0245245 A1 | 10/2007 | Blue et al. | 715/739 |
| 2007/0268392 A1 | 11/2007 | Paalasmaa et al. | |
| 2007/0271249 A1 | 11/2007 | Cragun et al. | 707/3 |
| 2008/0005064 A1 | 1/2008 | Sarukkai | 707/3 |
| 2008/0031506 A1 | 2/2008 | Agatheeswaran et al. | |
| 2008/0080745 A1 | 4/2008 | Vanhoucke et al. | 382/118 |
| 2008/0097958 A1 | 4/2008 | Ntoulas et al. | 707/2 |
| 2008/0209444 A1 | 8/2008 | Garrett et al. | 719/320 |
| 2008/0226119 A1 | 9/2008 | Candelore et al. | |
| 2008/0267504 A1* | 10/2008 | Schloter et al. | 382/181 |
| 2008/0317339 A1 | 12/2008 | Steinberg et al. | |
| 2009/0031244 A1 | 1/2009 | Brezina et al. | |
| 2009/0060289 A1 | 3/2009 | Shah et al. | 382/118 |
| 2009/0097748 A1 | 4/2009 | Lee et al. | 382/173 |
| 2009/0100048 A1 | 4/2009 | Hull et al. | 707/5 |
| 2009/0129571 A1 | 5/2009 | Altberg et al. | |
| 2009/0144056 A1 | 6/2009 | Aizenbud-Reshef et al. | |
| 2009/0237546 A1 | 9/2009 | Bloebaum et al. | 348/333.01 |
| 2009/0254539 A1 | 10/2009 | Wen et al. | |
| 2009/0285444 A1* | 11/2009 | Erol et al. | 382/100 |

(56) References Cited

U.S. PATENT DOCUMENTS

| | | | |
|---|---|---|---|
| 2009/0299990 A1* | 12/2009 | Setlur et al. | 707/5 |
| 2010/0046842 A1 | 2/2010 | Conwell | |
| 2010/0169770 A1 | 7/2010 | Hong et al. | |
| 2011/0035406 A1 | 2/2011 | Petrou et al. | |
| 2011/0085057 A1 | 4/2011 | Takahashi | |
| 2011/0131235 A1 | 6/2011 | Petrou et al. | |
| 2011/0135207 A1 | 6/2011 | Flynn et al. | |
| 2012/0093371 A1 | 4/2012 | Li et al. | |
| 2012/0134590 A1 | 5/2012 | Petrou et al. | |
| 2013/0121589 A1* | 5/2013 | Gokturk et al. | 382/195 |

FOREIGN PATENT DOCUMENTS

| | | | | |
|---|---|---|---|---|
| EP | 0942389 A2 | 9/1999 | | |
| EP | 1796019 A1 | 6/2007 | | G06K 9/03 |
| JP | H09330336 A | 12/1997 | | |
| JP | 2005165461 A | 6/2005 | | |
| JP | 2007018166 A | 1/2007 | | |
| KR | 20090073294 A | 7/2009 | | G06K 9/52 |
| WO | WO 00/49526 A1 | 8/2000 | | G06F 17/30 |
| WO | WO 02/17166 A2 | 2/2002 | | |
| WO | WO 02/42864 A3 | 5/2002 | | G06F 15/16 |
| WO | WO 2004/114163 A2 | 12/2004 | | G06F 17/30 |
| WO | WO 2005/114476 A1 | 12/2005 | | |
| WO | 2006043319 A1 | 4/2006 | | |
| WO | WO 2006/070047 A1 | 7/2006 | | |
| WO | WO 2006/137667 A1 | 12/2006 | | H04Q 7/24 |
| WO | WO 2008/097051 A1 | 8/2008 | | G06F 17/30 |

OTHER PUBLICATIONS

Anagnostopoulos, I et al., "Information Fusion Meta-Search Interface for Precise Photo Acquisition on the Web," 25th International Conference on Information Technology Interfaces, ITI 2003, Jun. 16-19, 2003, Cavtat, Croatia, pp. 375-381.
International Search Report and Written Opinion, PCT/US2010/045631, Sep. 5, 2011, 12 pages.
Anonymous, GPS Enabled Dating??, http://andrightlyso.com/2006/11/30/gps-enabled-dating, Nov. 30, 2006, 21 pgs.
Frucci, Half-Amazing, Half-Terrifying Concept App Combines Facial Recognition with Augmented Reality, Jul. 22, 2009, 2 pgs.
International Search Report and Written Opinion, PCT/US2010/044771, Dec. 16, 2010, 13 pgs.
International Search Report and Written Opinion, PCT/US2010/044885, Oct. 20, 2010, 7 pgs.
International Search Report and Written Opinion, PCT/US2010/045009, Nov. 17, 2010, 7 pgs.
International Search Report and Written Opinion, PCT/US2010/045316, Dec. 7, 2010, 6 pgs.
Stone, Autotagging Facebook: social network context improves photo annotation, IEEE Computer Society Confeence on Computer Vision and Pattern Recognition Workshops, Piscataway, NJ, Jun. 2008, 8 pgs.
Anonymous, *Wie erstelle ich bei StudiVZ eine Bilder-Verlinkung?(How do I create an image with StudiVZ-linking?)*, www.limillimil.de/wie-erstelle-ich-bei-studivz-eine-bilder-verlinkung-758.html, 2008, 10 pages.
Castro, *iPhoto's new Faces feature really does work!*, www.pigsgourdandwikis.com/2009/02/iphotos-new-faces-geature-really-does.html, Feb. 17, 2009, 8 pages.
International Search Report/Written Opinion, PCT/US2010/044603, Nov. 17, 2010, 11 pages.
Bharat, *Personalized, Interactive News on the Web*, Georgia Institute of Technology, Atlanta, GA, May 5, 1997, pp. 1-22.
*Bloom filter*, Wikipedia, en.wikipedia.org/wiki/Bloom_filter (last modified Feb. 13, 2005).
Bloom, *Space/Time Trade-offs in Hash Coding with Allowable Errors*, Communications of the ACM, vol. 13, No. 7, Jul. 1970, pp. 422-426.
Brill, *An Analysis of the AskMSR Question-Answering System*, Proceedings of the Conference of Empirical Methods in Natural Language Processing (EMNLP), Jul. 2002, 8 pages.
Brin, *Extracting Patterns and Relations from the World Wide Web*, Computer Science Department, Stanford University, 1999, 12 pages.
Brin, *The Anatomy of a Large-Scale Hypertextual Web Search Engine*, 7th International World Wide Web Conference, Brisbane, Australia, Apr. 14-18, 1998, pp. 1-26.
Cao, *Bloom Filters—the math*, www.cs.wisc.edu/~cao/papers/summary-cache/node8.html, Jul. 5, 1998, pp. 1-6.
Chang, *IEPAD: Information Extraction Based on Pattern Discovery*, WWW10 '01, ACM, Hong Kong, May 1-5, 2001, pp. 681-688.
Chesnais, *The Fishwrap Personalized News System*, Community Networking, Integrated Multimedia Services to the Home, Proceedings of the Second International Workshop on, Jun. 20-22, 1995, pp. 275-282.
Chu-Carroll, *A Multi-Strategy with Multi-Source Approach to Question Answering*, IBM T.J. Watson Research Center, Yorktown Heights, NY, 2006, 8 pages.
Clarke, *FrontPage 2002 Tutorials—Adding Functionality to your Website with FrontPage 2002 Part II—Navigation*, ABC—All 'Bout Computers, Apr. 2002, vol. 11, accessfp.net/fronpagenavigation.htm, 8 pages.
Cowie, *MOQA: Meaning-Oriented Question Answering*, Proceedings of RIAO 2004, 15 pages.
Dean, *MapReduce: Simplified Data Processing on Large Clusters*, OSDI, 2004, pp. 1-13.
Etzioni, *Web-scale Information Extraction in KnowItAll (Preliminary Results)*, WWW2004, ACM, New York, NY, May 17-20, 2004, 11 pages.
Freitag, *Boosted Wrapper Induction*, American Association for Artificial Intelligence, 2000, 7 pages.
Guha, *Disambiguating People in Search*, WWW2004, New York, NY, May 17-22, 2004, 9 pages.
Guha, *Object Co-Identification on the Semantic Web*, WWW2004, ACM, New York, NY, May 17-22, 2004, 9 pages.
Hogue, *Tree Pattern Inference and Matching for Wrapper Induction on the World Wide Web*, Master of Engineering in Electrical Engineering and Computer Science, Massachusetts Institute of Technology, Jun. 2004, pp. 1-106.
Ilyas, *Rank-Aware Query Optimization*, ACM SIGMOD 2004, Paris, France, Jun. 13-18, 2004, 12 pages.
*Information Entropy*—Wikipedia, the free encyclopedia, retrieved on May 3, 2006, pp. 1-9.
*Information Theory*—Wikipedia, the free encyclopedia, retrieved on May 3, 2006, pp. 1-12.
International Search Report/Written Opinion, PCT/US06/07639, Sep. 13, 2006, 5 pages.
International Search Report/Written Opinion, PCT/US07/061157, Feb. 15, 2008, 10 pages.
International Search Report/Written Opinion, PCT/US07/61156, Feb. 11, 2008, 5 pages.
International Search Report/Written Opinion, PCT/US2006/010965, Jul. 5, 2006, 9 pages.
International Search Report/Written Opinion, PCT/US2007/061158, Feb. 28, 2008, 7 pages.
Jones, *Bootstrapping for Text Learning Tasks*, Carnegie Mellon University, Pittsburgh, PA, 1999, 12 pages.
Kamba, *The Krakatoa Chronicle, An interactive, Personalized, Newspaper on the Web*, w3.ord/conferences/www4/papers/93, 1993, pp. 1-12.
Kosseim, *Answer Formulation for Question-Answering*, Concordia University, Montreal, Quebec, Canada, Oct. 1, 2007, 11 pages.
Lin, *Question Answering from the Web Using Knowledge Annotation and Knowledge Mining Techniques*, CIKM'03, New Orleans, LA, Nov. 3-8, 2003, pp. 116-123.
Liu, *Mining Data Records in Web Pages*, Conference '00, ACM 2000, pp. 1-10.
McCallum, *Object Consolidation by Graph Partitioning with a Conditionally-Trained Distance Metric*, SIGKDD 03, Washington, DC, Aug. 24-27, 2003, 6 pages.

(56) References Cited

OTHER PUBLICATIONS

Mihalcea, *PageRank on Semantic Networks, with Application to Word Sense Disambiguation,* Proceedings of the 20th International Conference on Computational Linguistics, Aug. 23-27, 2004, 7 pages.
Mihalcea, *TextRank: Bringing Order into Texts,* Proceedings of the Conference on Empirical Methods in Natural Language Processing, Jul. 2004, 8 pages.
Nyberg, *The JAVELIN Question-Answering System at TREC2003: A Multi Strategy Approach With Dynamic Planning,* TREC2003, Nov. 18-21, 2003, 9 pages.
Ogden, *Improving Cross-Language Text Retrieval with Human Interactions,* Proc. of the 33rd Hawaii International Conference on System Sciences, IEEE 2000, pp. 1-9.
Prager, *IBM's Piquant in TREC2003,* Nov. 18-21, 2003, 10 pages.
Prager, *Question Answering Using Constraint Satisfaction: QA-by Dossier with Constraints,* 2004, 8 pages.
Ramakrishnan, *Is Question Answering an Acquired Skill?,* WWW2004, New York, NY, May 17, 2004, pp. 111-120.
*The Math Works, Using Matlab Graphics,* Version 5, MathWorks, Natick, MA, Dec. 1996.
Thompson, *Freshman Publishing Experiment Offers Made-to-Order Newspapers,* MIT News Office, http://web.mit.edu/newsoffice/1994/newspaper-0309.html, 1994, pp. 1-4.
Google Inc., International Search Report and Written Opinion, PCT/US2011/062930, May 2, 2012, 10 pgs.
Google Inc., Office Action, Australian Patent Application No. 2010279333, Jul. 19, 2012, 3 pgs.
Google Inc., Office Action, Australian Patent Application No. 2010279334, Jul. 24, 2012, 3 pgs.
Google Inc., Office Action, Australian Patent Application No. 2010326654, Aug. 22, 2012, 3 pgs.
Petrou, Office Action, U.S. Appl. No. 12/850,483, Mar. 9, 2012, 9 PGS.
Petrou, Office Action, U.S. Appl. No. 12/851,473, Sep. 11, 2012, 33 pgs.
Petrou, Office Action, U.S. Appl. No. 12/852,189, Sep. 13, 2012, 9 pgs.
Petrou, Office Action, U.S. Appl. No. 12/853,878, Feb. 1, 2012, 26 pgs.
Petrou, Office Action, U.S. Appl. No. 12/853,878, Jun. 13, 2012, 41 pgs.
Petrou, Office Action, U.S. Appl. No. 12/854,793, Feb. 17, 2012, 31 pgs.
Petrou, Office Action, U.S. Appl. No. 12/854,793, Jun. 13, 2012, 33 pgs.
Petrou, Office Action, U.S. Appl. No. 12/855,563, Oct. 5, 2012, 22 pgs.
Google Inc., Notice of Acceptance, AU 2010279333, Feb. 8, 2013, 3 pgs.
Google Inc., Office Action, AU 2010279248, Oct. 4, 2012, 3 pgs.
Google Inc., Office Action, AU 2010279248, Feb. 5, 2013, 3 pgs.
Google Inc., Office Action, AU 2010279334, Jan. 31, 2013, 3 pgs.
Google Inc., Office Action, AU 2010326655, Nov. 23, 2012, 3 pgs.
Google Inc., Office Action, CN 201080045164.6, Feb. 8, 2013, 15 pgs.
Google Inc., Office Action, EP 10742974.8, Dec. 3, 2012, 7 pgs.
Petrou, Office Action, U.S. Appl. No. 12/850,483, Mar. 26, 2013, 11 pgs.
Petrou, Office Action, U.S. Appl. No. 12/851,473, Mar. 29, 2013, 34 pgs.
Petrou, Office Action, U.S. Appl. No. 12/852,189, Apr. 1, 2013, 11 pgs.
Petrou, Office Action, U.S. Appl. No. 12/853,188, May 8, 2013, 21 pgs.
Japanese Office Action in Japanese Application No. 2012-523961, dated Jan. 30, 2014, 7 pages (with English translation).
Bengio, Office Action, U.S. Appl. No. 13/570,162, Oct. 15, 2013, 20 pgs.
Google Inc., Patent Examination Report No. 2, AU 2010326654, Sep. 6, 2013, 3 pgs.
Google Inc., Patent Examination Report No. 2, AU 2010326655, May 29, 2013, 3 pgs.
Google Inc., Patent Examination Report No. 3, AU 2010279334, Jun. 27, 2013, 3 pgs.
Petrou, Final Office Action, U.S. Appl. No. 12/855,563, Jul. 5, 2013, 24 pgs.
Petrou, Notice of Allowance, U.S. Appl. No. 12/851,473, Oct. 8, 2013, 11 pgs.
Petrou, Office Action, U.S. Appl. No. 13/309,471, Sep. 27, 2013, 12 pgs.
Decision of Rejection in Japanese Application No. 2012-523961, mailed Aug. 18, 2014, 4 pages (with English translation).

* cited by examiner

USER INTERFACE FOR PRESENTING SEARCH RESULTS FOR MULTIPLE REGIONS OF A VISUAL QUERY

RELATED APPLICATIONS

This application claims priority to the following U.S. Provisional Patent Applications all of which are incorporated by reference herein in their entirety: U.S. Provisional Patent Application No. 61/266,122, filed Dec. 2, 2009, entitled "User Interface for Presenting Search Results for Multiple Regions of a Visual Query" and U.S. Provisional Patent Application No. 61/232,397, filed Aug. 7, 2009, entitled "Architecture for Responding to a Visual Query."

This application is related to the following U.S. Provisional Patent Applications all of which are incorporated by reference herein in their entirety: U.S. Provisional Patent Application No. 61/266,116, filed Dec. 2, 2009, entitled "Architecture for Responding to a Visual Query;" U.S. Provisional Patent Application No. 61/266,125, filed Dec. 2, 2009, entitled "Identifying Matching Canonical Documents In Response To A Visual Query;" U.S. Provisional Patent Application No. 61/266,126, filed Dec. 2, 2009, entitled "Region of Interest Selector for Visual Queries;" U.S. Provisional Patent Application No. 61/266,130, filed Dec. 2, 2009, entitled "Actionable Search Results for Visual Queries;" U.S. Provisional Patent Application No. 61/266,133, filed Dec. 2, 2009, entitled "Actionable Search Results for Street View Visual Queries" and U.S. Provisional Patent Application No. 61/266,499, filed Dec. 3, 2009, entitled "Hybrid Use Location Sensor Data and Visual Query to Return Local Listing for Visual Query."

TECHNICAL FIELD

The disclosed embodiments relate generally to a presenting search results by a plurality of parallel search systems for processing a visual query.

BACKGROUND

A text-based or term-based searching, wherein a user inputs a word or phrase into a search engine and receives a variety of results is a useful tool for searching. However, term based queries require that a user be able to input a relevant term. Sometimes a user may wish to know information about an image. For example, a user might want to know the name of a person in a photograph, or a user might want to know the name of a flower or bird in a picture. Accordingly, a system that can receive a visual query and provide search results would be desirable.

SUMMARY

According to some embodiments, a computer-implemented method of processing a visual query includes performing the following steps on a server system having one or more processors and memory storing one or more programs for execution by the one or more processors. A visual query from a client system is received. The visual query is processed by sending the visual query to a plurality of parallel search systems for simultaneous processing. Each of the plurality of search systems implements a distinct visual query search process of a plurality of visual query search processes. Then the server system receives a plurality of search results from one or more of the plurality of parallel search systems. It creates an interactive results document comprising one or more visual identifiers of respective sub-portions of the visual query. Each visual identifier has at least one user selectable link to at least one of the search results. Finally, the server system sends the interactive results document to the client system. In some embodiments, the search result includes data related to the corresponding sub-portion of the visual query.

In some embodiments, the sending further comprises sending a subset of the plurality of search results in a search results list for presentation with the interactive results document. Optionally, the method further comprises, receiving a user selection of the at least one user selectable link; and identifying a search result in the search results list corresponding to the selected link.

In some embodiments, the visual identifiers comprise one or more bounding boxes around respective sub-portions of the visual query. The bounding boxes may be square or may outline the respective sub-portion of the visual query. Optionally, some bounding boxes include smaller bounding boxes inside of them.

In some embodiments, each of the bounding boxes includes a user selectable link to one or more search results, and the user selectable link has an activation region corresponding to the sub-portion of the visual query surrounded by the bounding box. Even in embodiments where the visual identifiers are not bounding boxes, a respective user selectable link has an activation region which corresponds to the sub-portion of the visual query that is associated with a corresponding visual identifier.

In some embodiments, when the selectable sub-portion contains text, the method further includes sending the text of the selectable sub-portion to a text based query processing system. In other embodiments, when the sub-portion of the visual query corresponds to a respective visual identifier containing text, the search results corresponding to the respective visual identifier include results from a term query search on at least one of the terms in the text.

In some embodiments, when the sub-portion of the visual query corresponding to a respective visual identifier contains a person's face, the search results corresponding to the respective visual identifier include a name, a handle, contact information, account information, address information, current location of a related mobile device associated with the person who's face is contained in the selectable sub-portion other images of the person who's face is contained in the selectable sub-portion, and/or potential image matches for the person's face.

In some embodiments, when the sub-portion of the visual query corresponding to a respective visual identifier contains a product, the search results corresponding to the respective visual identifier include product information, a product review, an option to initiate purchase of the product, an option to initiate a bid on the product, a list of similar products, and/or a list of related products.

In some embodiments, a respective visual identifier of the one or more visual identifiers is formatted for presentation in a visually distinctive manner in accordance with a type of recognized entity in the respective sub-portion of the visual query. The respective visual identifier may be formatted for presentation in a visually distinctive such as overlay color, overlay pattern, label background color, label background pattern, label font color, and border color.

In some embodiments, a respective visual identifier of the one or more visual identifiers comprises a label consisting of at least one term associated with the image in the respective sub-portion of the visual query. The label is formatted for presentation in the interactive results document on or near the respective sub-portion.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if is detected" may be construed to mean "upon determining" or "in response to determining" or "upon detecting (the stated condition or event)" or "in response to detecting (the stated condition or event)," depending on the context.

Figure 1:
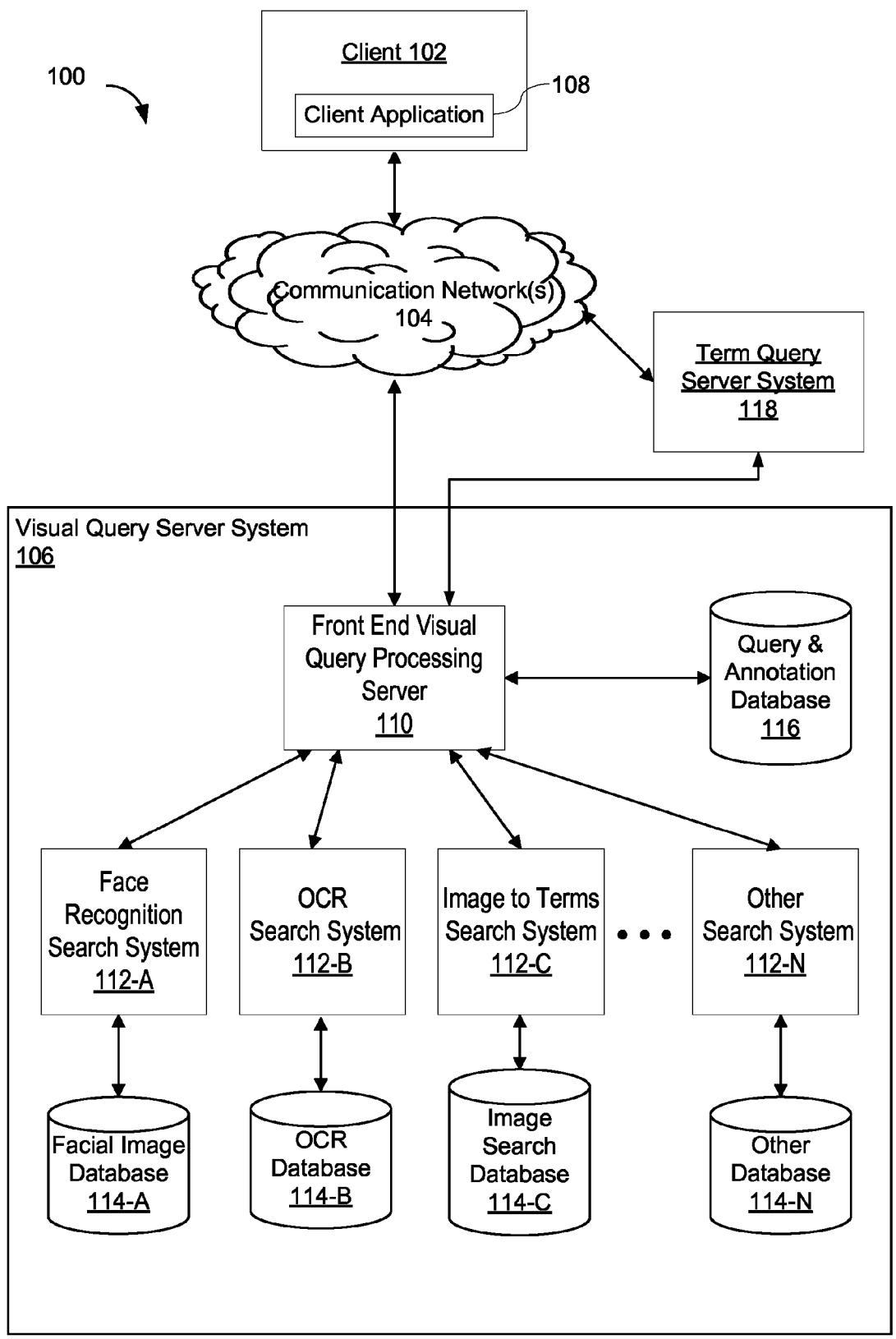
FIG. 1 is a block diagram illustrating a computer network that includes a visual query server system.

FIG. 1 is a block diagram illustrating a computer network that includes a visual query server system according to some embodiments. The computer network 100 includes one or more client systems 102 and a visual query server system 106. One or more communications networks 104 interconnect these components. The communications network 104 may be any of a variety of networks, including local area networks (LAN), wide area networks (WAN), wireless networks, wireline networks, the Internet, or a combination of such networks.

Figure 11:
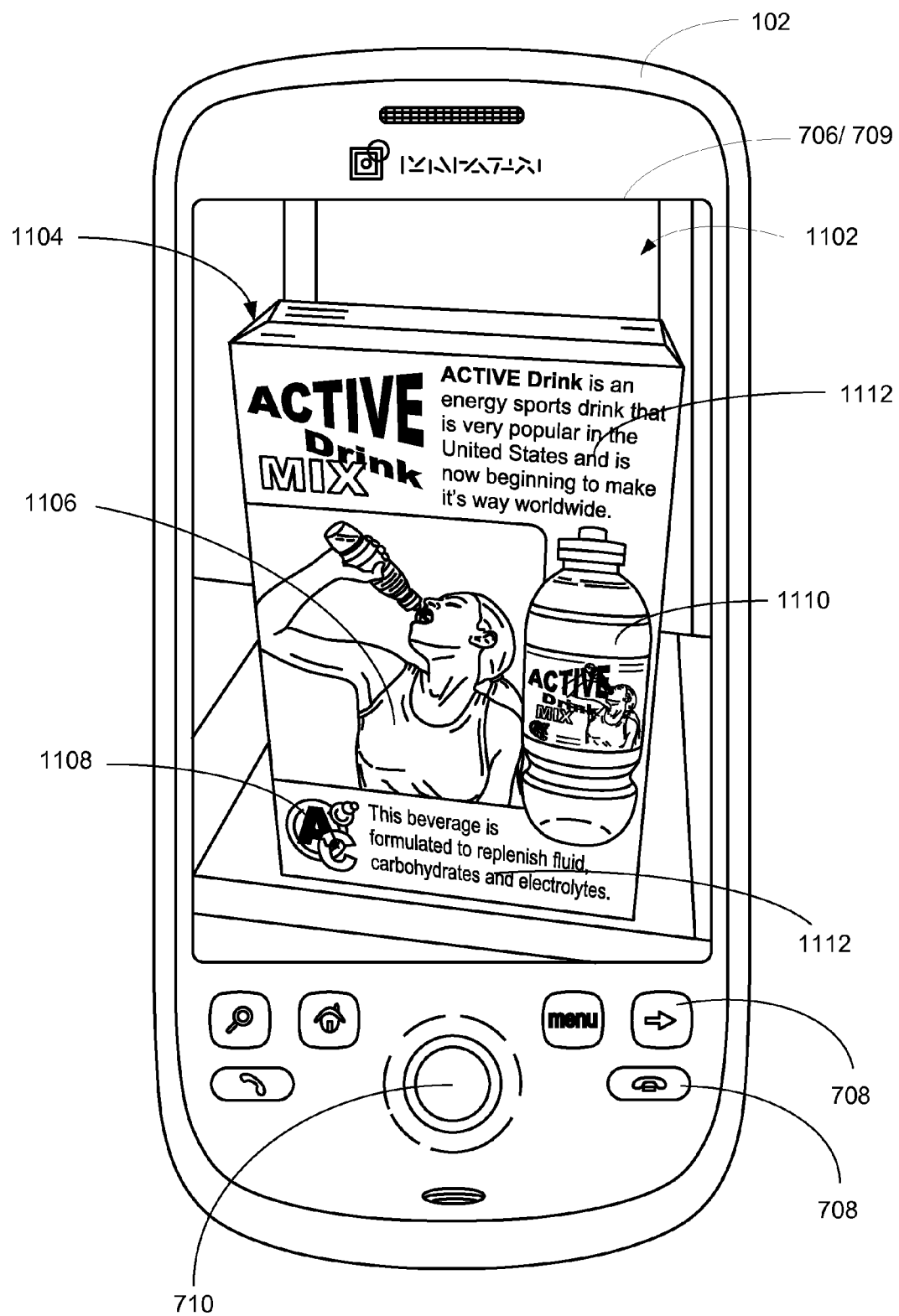
FIG. 11 illustrates a client system with a screen shot of an exemplary visual query, in accordance with some embodiments.

The client system 102 includes a client application 108, which is executed by the client system, for receiving a visual query (e.g., visual query 1102 of FIG. 11). A visual query is an image that is submitted as a query to a search engine or search system. Examples of visual queries, without limitations include photographs, scanned documents and images, and drawings. In some embodiments, the client application 108 is selected from the set consisting of a search application, a search engine plug-in for a browser application, and a search engine extension for a browser application. In some embodiments, the client application 108 is an "omnivorous" search box, which allows a user to drag and drop any format of image into the search box to be used as the visual query.

A client system 102 sends queries to and receives data from the visual query server system 106. The client system 102 may be any computer or other device that is capable of communicating with the visual query server system 106. Examples include, without limitation, desktop and notebook computers, mainframe computers, server computers, mobile devices such as mobile phones and personal digital assistants, network terminals, and set-top boxes.

The visual query server system 106 includes a front end visual query processing server 110. The front end server 110 receives a visual query from the client 102, and sends the visual query to a plurality of parallel search systems 112 for simultaneous processing. The search systems 112 each implement a distinct visual query search process and access their corresponding databases 114 as necessary to process the visual query by their distinct search process. For example, a face recognition search system 112-A will access a facial image database 114-A to look for facial matches to the image query. As will be explained in more detail with regard to FIG.

9, if the visual query contains a face, the facial recognition search system 112-A will return one or more search results (e.g., names, matching faces, etc.) from the facial image database 114-A. In another example, the optical character recognition (OCR) search system 112-B, converts any recognizable text in the visual query into text for return as one or more search results. In the optical character recognition (OCR) search system 112-B, an OCR database 114-B may be accessed to recognize particular fonts or text patterns as explained in more detail with regard to FIG. 8.

Any number of parallel search systems 112 may be used. Some examples include a facial recognition search system 112-A, an OCR search system 112-B, an image-to-terms search system 112-C (which may recognize an object or an object category), a product recognition search system (which may be configured to recognize 2-D images such as book covers and CDs and may also be configured to recognized 3-D images such as furniture), bar code recognition search system (which recognizes 1D and 2D style bar codes), a named entity recognition search system, landmark recognition (which may configured to recognize particular famous landmarks like the Eiffel Tower and may also be configured to recognize a corpus of specific images such as billboards), place recognition aided by geo-location information provided by a GPS receiver in the client system 102 or mobile phone network, a color recognition search system, and a similar image search system (which searches for and identifies images similar to a visual query). Further search systems can be added as additional parallel search systems, represented in FIG. 1 by system 112-N. All of the search systems, except the OCR search system, are collectively defined herein as search systems performing an image-match process. All of the search systems including the OCR search system are collectively referred to as query-by-image search systems. In some embodiments, the visual query server system 106 includes a facial recognition search system 112-A, an OCR search system 112-B, and at least one other query-by-image search system 112.

The parallel search systems 112 each individually process the visual search query and return their results to the front end server system 110. In some embodiments, the front end server 100 may perform one or more analyses on the search results such as one or more of: aggregating the results into a compound document, choosing a subset of results to display, and ranking the results as will be explained in more detail with regard to FIG. 6. The front end server 110 communicates the search results to the client system 102.

The client system 102 presents the one or more search results to the user. The results may be presented on a display, by an audio speaker, or any other means used to communicate information to a user. The user may interact with the search results in a variety of ways. In some embodiments, the user's selections, annotations, and other interactions with the search results are transmitted to the visual query server system 106 and recorded along with the visual query in a query and annotation database 116. Information in the query and annotation database can be used to improve visual query results. In some embodiments, the information from the query and annotation database 116 is periodically pushed to the parallel search systems 112, which incorporate any relevant portions of the information into their respective individual databases 114.

The computer network 100 optionally includes a term query server system 118, for performing searches in response to term queries. A term query is a query containing one or more terms, as opposed to a visual query which contains an image. The term query server system 118 may be used to generate search results that supplement information produced by the various search engines in the visual query server system 106. The results returned from the term query server system 118 may include any format. The term query server system 118 may include textual documents, images, video, etc. While term query server system 118 is shown as a separate system in FIG. 1, optionally the visual query server system 106 may include a term query server system 118.

Additional information about the operation of the visual query server system 106 is provided below with respect to the flowcharts in FIGS. 2-4.

Figure 2:
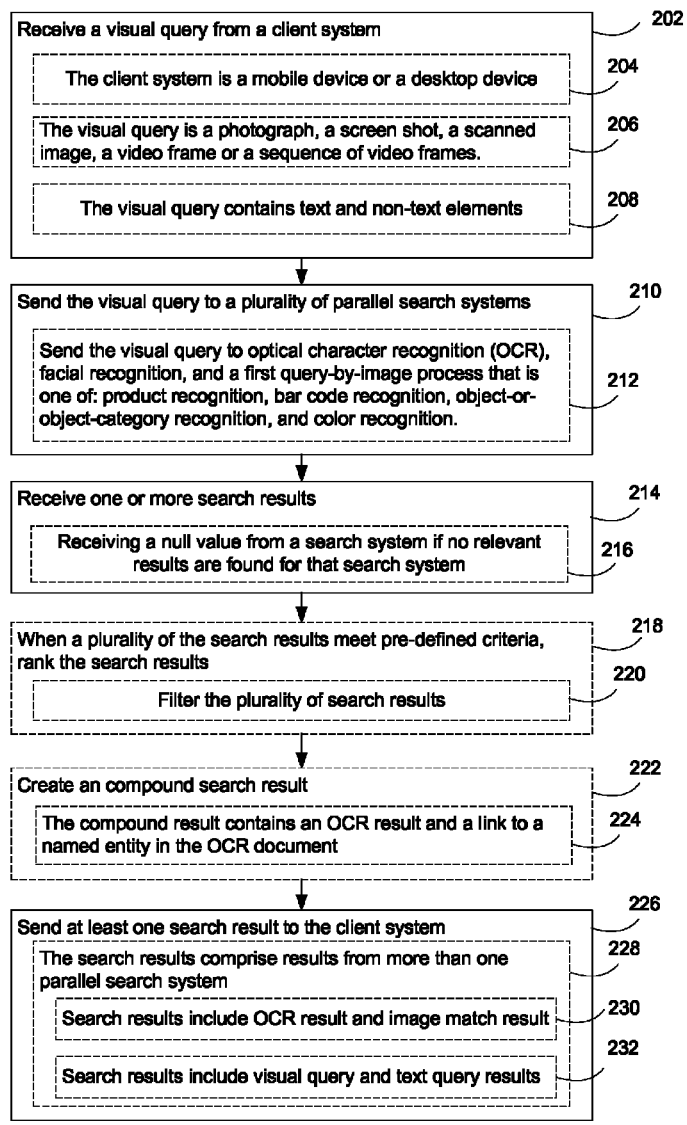
FIG. 2 is a flow diagram illustrating the process for responding to a visual query, in accordance with some embodiments.

FIG. 2 is a flow diagram illustrating a visual query server system method for responding to a visual query, according to certain embodiments of the invention. Each of the operations shown in FIG. 2 may correspond to instructions stored in a computer memory or computer readable storage medium.

The visual query server system receives a visual query from a client system (202). The client system, for example, may be a desktop computing device, a mobile device, or another similar device (204) as explained with reference to FIG. 1. An example visual query on an example client system is shown in FIG. 11.

The visual query is an image document of any suitable format. For example, the visual query can be a photograph, a screen shot, a scanned image, or a frame or a sequence of multiple frames of a video (206). In some embodiments, the visual query is a drawing produced by a content authoring program (736, FIG. 5). As such, in some embodiments, the user "draws" the visual query, while in other embodiments the user scans or photographs the visual query. Some visual queries are created using an image generation application such as Acrobat, a photograph editing program, a drawing program, or an image editing program. For example, a visual query could come from a user taking a photograph of his friend on his mobile phone and then submitting the photograph as the visual query to the server system. The visual query could also come from a user scanning a page of a magazine, or taking a screen shot of a webpage on a desktop computer and then submitting the scan or screen shot as the visual query to the server system. In some embodiments, the visual query is submitted to the server system 106 through a search engine extension of a browser application, through a plug-in for a browser application, or by a search application executed by the client system 102. Visual queries may also be submitted by other application programs (executed by a client system) that support or generate images which can be transmitted to a remotely located server by the client system.

The visual query can be a combination of text and non-text elements (208). For example, a query could be a scan of a magazine page containing images and text, such as a person standing next to a road sign. A visual query can include an image of a person's face, whether taken by a camera embedded in the client system or a document scanned by or otherwise received by the client system. A visual query can also be a scan of a document containing only text. The visual query can also be an image of numerous distinct subjects, such as several birds in a forest, a person and an object (e.g., car, park bench, etc.), a person and an animal (e.g., pet, farm animal, butterfly, etc.). Visual queries may have two or more distinct elements. For example, a visual query could include a barcode and an image of a product or product name on a product package. For example, the visual query could be a picture of a book cover that includes the title of the book, cover art, and a bar code. In some instances, one visual query will produce two or more distinct search results corresponding to different portions of the visual query, as discussed in more detail below.

The server system processes the visual query as follows. The front end server system sends the visual query to a plurality of parallel search systems for simultaneous processing (210). Each search system implements a distinct visual query search process, i.e., an individual search system processes the visual query by its own processing scheme.

In some embodiments, one of the search systems to which the visual query is sent for processing is an optical character recognition (OCR) search system. In some embodiments, one of the search systems to which the visual query is sent for processing is a facial recognition search system. In some embodiments, the plurality of search systems running distinct visual query search processes includes at least: optical character recognition (OCR), facial recognition, and another query-by-image process other than OCR and facial recognition (212). The other query-by-image process is selected from a set of processes that includes but is not limited to product recognition, bar code recognition, object-or-object-category recognition, named entity recognition, and color recognition (212).

In some embodiments, named entity recognition occurs as a post process of the OCR search system, wherein the text result of the OCR is analyzed for famous people, locations, objects and the like, and then the terms identified as being named entities are searched in the term query server system (118, FIG. 1). In other embodiments, images of famous landmarks, logos, people, album covers, trademarks, etc. are recognized by an image-to-terms search system. In other embodiments, a distinct named entity query-by-image process separate from the image-to-terms search system is utilized. The object-or-object category recognition system recognizes generic result types like "car." In some embodiments, this system also recognizes product brands, particular product models, and the like, and provides more specific descriptions, like "Porsche." Some of the search systems could be special user specific search systems. For example, particular versions of color recognition and facial recognition could be a special search systems used by the blind.

The front end server system receives results from the parallel search systems (214). In some embodiments, the results are accompanied by a search score. For some visual queries, some of the search systems will find no relevant results. For example, if the visual query was a picture of a flower, the facial recognition search system and the bar code search system will not find any relevant results. In some embodiments, if no relevant results are found, a null or zero search score is received from that search system (216). In some embodiments, if the front end server does not receive a result from a search system after a pre-defined period of time (e.g., 0.2, 0.5, 1, 2 or 5 seconds), it will process the received results as if that timed out server produced a null search score and will process the received results from the other search systems.

Optionally, when at least two of the received search results meet pre-defined criteria, they are ranked (218). In some embodiments, one of the predefined criteria excludes void results. A pre-defined criterion is that the results are not void. In some embodiments, one of the predefined criteria excludes results having numerical score (e.g., for a relevance factor) that falls below a pre-defined minimum score. Optionally, the plurality of search results are filtered (220). In some embodiments, the results are only filtered if the total number of results exceeds a pre-defined threshold. In some embodiments, all the results are ranked but the results falling below a pre-defined minimum score are excluded. For some visual queries, the content of the results are filtered. For example, if some of the results contain private information or personal protected information, these results are filtered out.

Optionally, the visual query server system creates a compound search result (222). One embodiment of this is when more than one search system result is embedded in an interactive results document as explained with respect to FIG. 3. The term query server system (118, FIG. 1) may augment the results from one of the parallel search systems with results from a term search, where the additional results are either links to documents or information sources, or text and/or images containing additional information that may be relevant to the visual query. Thus, for example, the compound search result may contain an OCR result and a link to a named entity in the OCR document (224).

In some embodiments, the OCR search system (112-B, FIG. 1) or the front end visual query processing server (110, FIG. 1) recognizes likely relevant words in the text. For example, it may recognize named entities such as famous people or places. The named entities are submitted as query terms to the term query server system (118, FIG. 1). In some embodiments, the term query results produced by the term query server system are embedded in the visual query result as a "link." In some embodiments, the term query results are returned as separate links. For example, if a picture of a book cover were the visual query, it is likely that an object recognition search system will produce a high scoring hit for the book. As such a term query for the title of the book will be run on the term query server system 118 and the term query results are returned along with the visual query results. In some embodiments, the term query results are presented in a labeled group to distinguish them from the visual query results. The results may be searched individually, or a search may be performed using all the recognized named entities in the search query to produce particularly relevant additional search results. For example, if the visual query is a scanned travel brochure about Paris, the returned result may include links to the term query server system 118 for initiating a search on a term query "Notre Dame." Similarly, compound search results include results from text searches for recognized famous images. For example, in the same travel brochure, live links to the term query results for famous destinations shown as pictures in the brochure like "Eiffel Tower" and "Louvre" may also be shown (even if the terms "Eiffel Tower" and "Louvre" did not appear in the brochure itself.)

The visual query server system then sends at least one result to the client system (226). Typically, if the visual query processing server receives a plurality of search results from at least some of the plurality of search systems, it will then send at least one of the plurality of search results to the client system. For some visual queries, only one search system will return relevant results. For example, in a visual query containing only an image of text, only the OCR server's results may be relevant. For some visual queries, only one result from one search system may be relevant. For example, only the product related to a scanned bar code may be relevant. In these instances, the front end visual processing server will return only the relevant search result(s). For some visual queries, a plurality of search results are sent to the client system, and the plurality of search results include search results from more than one of the parallel search systems (228). This may occur when more than one distinct image is in the visual query. For example, if the visual query were a picture of a person riding a horse, results for facial recognition of the person could be displayed along with object identification results for the horse. In some embodiments, all the results for a particular query by image search system are grouped and presented together. For example, the top N facial recognition results are displayed under a heading "facial recognition results" and the top N object recognition results are displayed together under a heading "object recognition results." Alternatively, as discussed below, the search results from a particular image search system may be grouped by image region. For example, if the visual query includes two faces, both of which produce facial recognition results, the results for each face would be presented as a distinct group. For some visual queries (e.g., a visual query including an image of both text and one or more objects), the search results may include both OCR results and one or more image-match results (230).

In some embodiments, the user may wish to learn more about a particular search result. For example, if the visual query was a picture of a dolphin and the "image to terms" search system returns the following terms "water," "dolphin," "blue," and "Flipper;" the user may wish to run a text based query term search on "Flipper." When the user wishes to run a search on a term query (e.g., as indicated by the user clicking on or otherwise selecting a corresponding link in the search results), the query term server system (118, FIG. 1) is accessed, and the search on the selected term(s) is run. The corresponding search term results are displayed on the client system either separately or in conjunction with the visual query results (232). In some embodiments, the front end visual query processing server (110, FIG. 1) automatically (i.e., without receiving any user command, other than the initial visual query) chooses one or more top potential text results for the visual query, runs those text results on the term query server system 118, and then returns those term query results along with the visual query result to the client system as a part of sending at least one search result to the client system (232). In the example above, if "Flipper" was the first term result for the visual query picture of a dolphin, the front end server runs a term query on "Flipper" and returns those term query results along with the visual query results to the client system. This embodiment, wherein a term result that is considered likely to be selected by the user is automatically executed prior to sending search results from the visual query to the user, saves the user time. In some embodiments, these results are displayed as a compound search result (222) as explained above. In other embodiments, the results are part of a search result list instead of or in addition to a compound search result.

Figure 3:
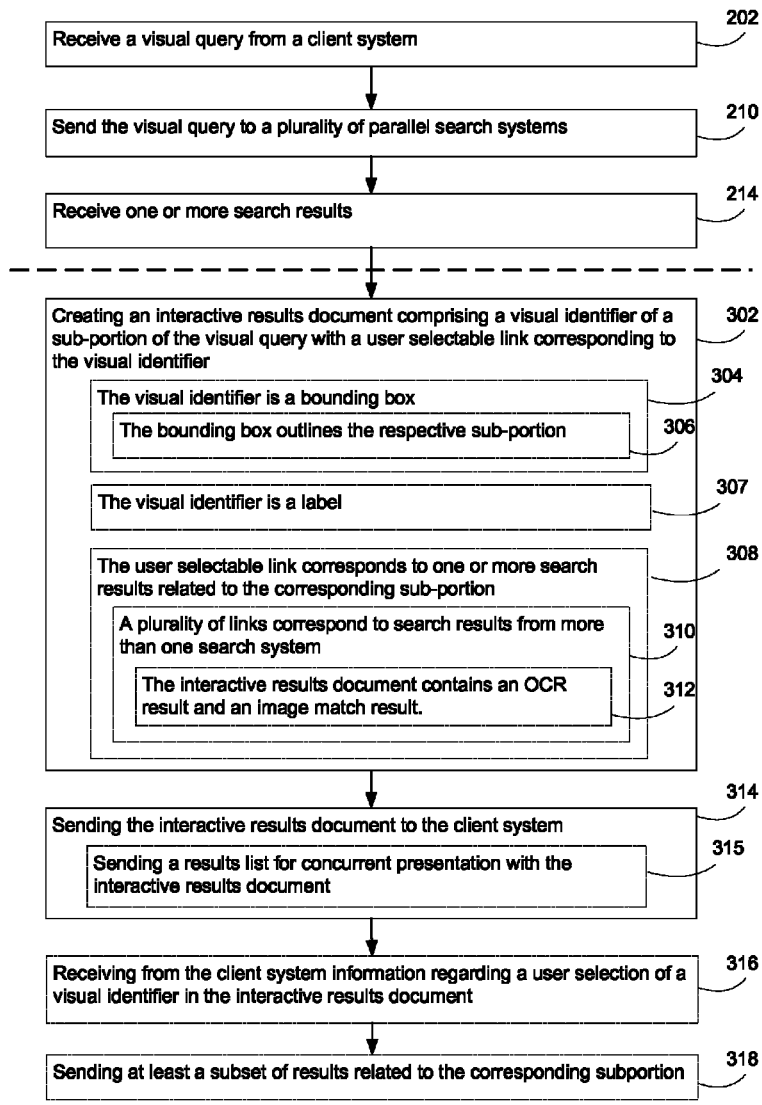
FIG. 3 is a flow diagram illustrating the process for responding to a visual query with an interactive results document, in accordance with some embodiments.

FIG. 3 is a flow diagram illustrating the process for responding to a visual query with an interactive results document. The first three operations (202, 210, 214) are described above with reference to FIG. 2. From the search results which are received from the parallel search systems (214), an interactive results document is created (302).

Creating the interactive results document (302) will now be described in detail. For some visual queries, the interactive results document includes one or more visual identifiers of respective sub-portions of the visual query. Each visual identifier has at least one user selectable link to at least one of the search results. A visual identifier identifies a respective sub-portion of the visual query. For some visual queries, the interactive results document has only one visual identifier with one user selectable link to one or more results. In some embodiments, a respective user selectable link to one or more of the search results has an activation region, and the activation region corresponds to the sub-portion of the visual query that is associated with a corresponding visual identifier.

Figures 12A, 12B:
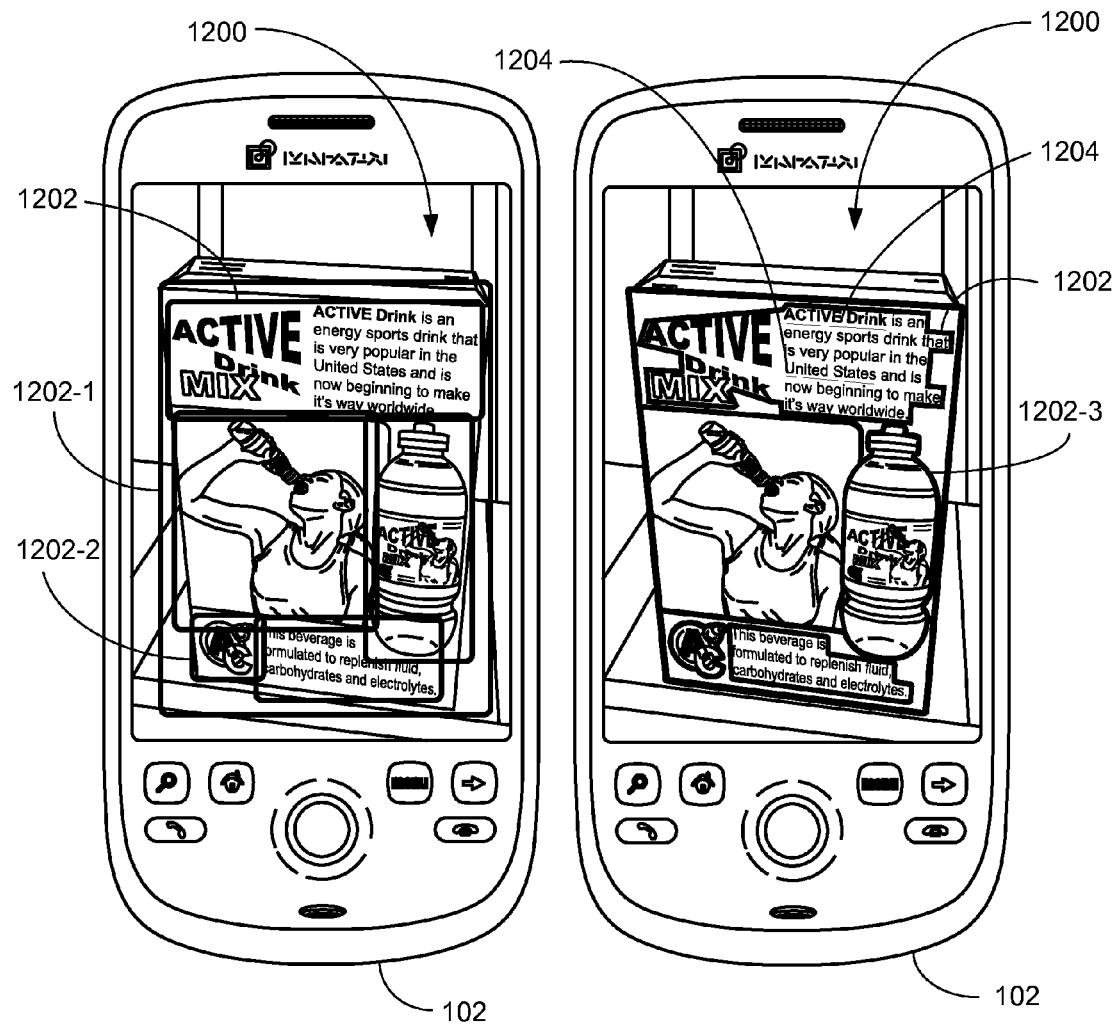
FIGS. 12A and 12B each illustrate a client system with a screen shot of an interactive results document with bounding boxes, in accordance with some embodiments.

In some embodiments, the visual identifier is a bounding box (304). In some embodiments, the bounding box encloses a sub-portion of the visual query as shown in FIG. 12A. The bounding box need not be a square or rectangular box shape but can be any sort of shape including circular, oval, conformal (e.g., to an object in, entity in or region of the visual query), irregular or any other shape as shown in FIG. 12B. For some visual queries, the bounding box outlines the boundary of an identifiable entity in a sub-portion of the visual query (306). In some embodiments, each bounding box includes a user selectable link to one or more search results, where the user selectable link has an activation region corresponding to a sub-portion of the visual query surrounded by the bounding box. When the space inside the bounding box (the activation region of the user selectable link) is selected by the user, search results that correspond to the image in the outlined sub-portion are returned.

Figure 14:
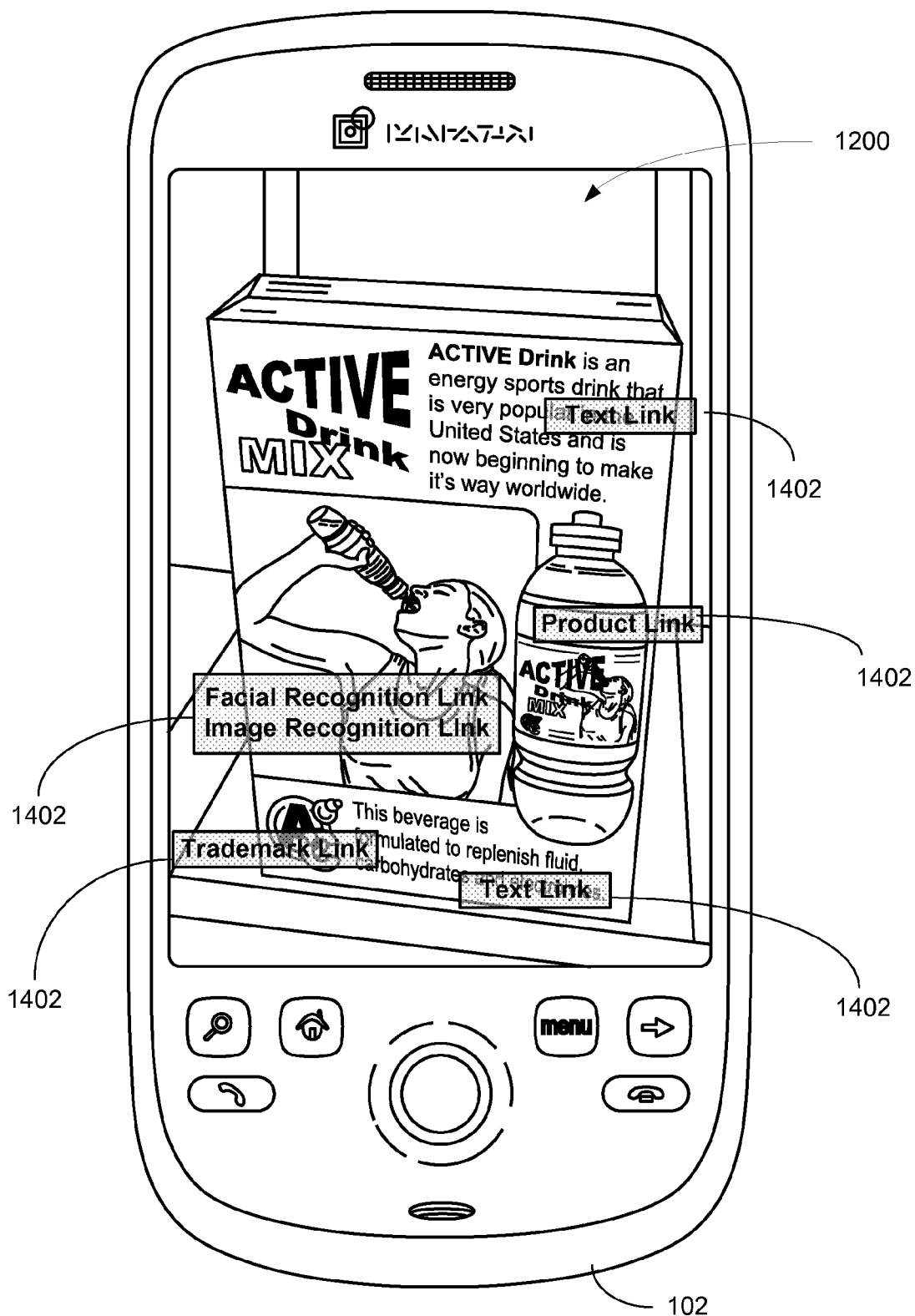
FIG. 14 illustrates a client system with a screen shot of an interactive results document with labels, in accordance with some embodiments.

In some embodiments, the visual identifier is a label (307) as shown in FIG. 14. In some embodiments, label includes at least one term associated with the image in the respective sub-portion of the visual query. Each label is formatted for presentation in the interactive results document on or near the respective sub-portion. In some embodiments, the labels are color coded.

Figure 13:
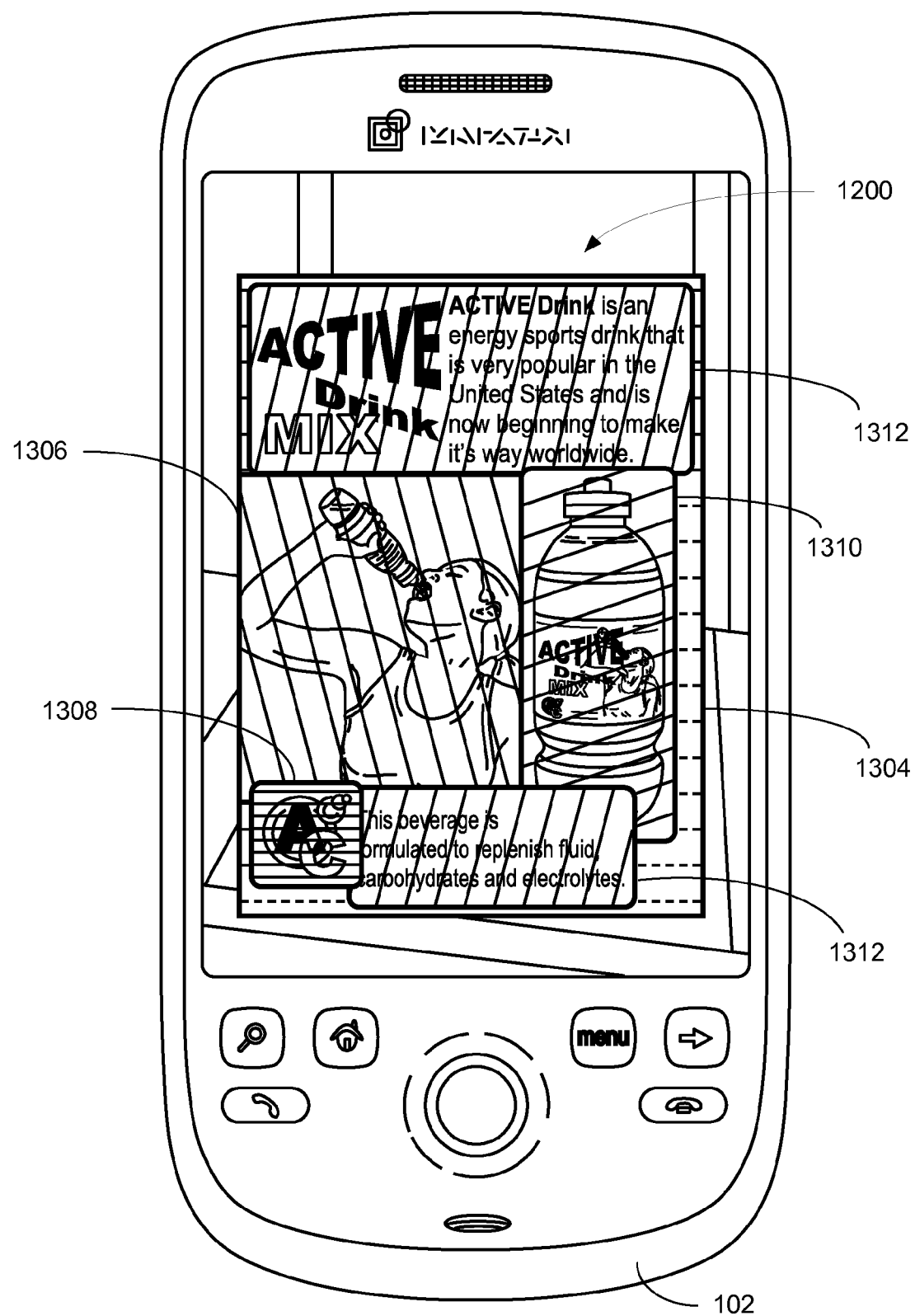
FIG. 13 illustrates a client system with a screen shot of an interactive results document that is coded by type, in accordance with some embodiments.

In some embodiments, each respective visual identifiers is formatted for presentation in a visually distinctive manner in accordance with a type of recognized entity in the respective sub-portion of the visual query. For example, as shown in FIG. 13, bounding boxes around a product, a person, a trademark, and the two textual areas are each presented with distinct cross-hatching patterns, representing differently colored transparent bounding boxes. In some embodiments, the visual identifiers are formatted for presentation in visually distinctive manners such as overlay color, overlay pattern, label background color, label background pattern, label font color, and border color.

In some embodiments, the user selectable link in the interactive results document is a link to a document or object that contains one or more results related to the corresponding sub-portion of the visual query (308). In some embodiments, at least one search result includes data related to the corresponding sub-portion of the visual query. As such, when the user selects the selectable link associated with the respective sub-portion, the user is directed to the search results corresponding to the recognized entity in the respective sub-portion of the visual query.

For example, if a visual query was a photograph of a bar code, there may be portions of the photograph which are irrelevant parts of the packaging upon which the bar code was affixed. The interactive results document may include a bounding box around only the bar code. When the user selects inside the outlined bar code bounding box, the bar code search result is displayed. The bar code search result may include one result, the name of the product corresponding to that bar code, or the bar code results may include several results such as a variety of places in which that product can be purchased, reviewed, etc.

In some embodiments, when the sub-portion of the visual query corresponding to a respective visual identifier contains text comprising one or more terms, the search results corresponding to the respective visual identifier include results from a term query search on at least one of the terms in the text. In some embodiments, when the sub-portion of the visual query corresponding to a respective visual identifier contains a person's face for which at least one match (i.e., search result) is found that meets predefined reliability (or other) criteria, the search results corresponding to the respective visual identifier include one or more of: name, handle, contact information, account information, address information, current location of a related mobile device associated with the person whose face is contained in the selectable sub-portion, other images of the person whose face is contained in the selectable sub-portion, and potential image matches for the person's face. In some embodiments, when the sub-portion of the visual query corresponding to a respective visual identifier contains a product for which at least one match (i.e., search result) is found that meets predefined reliability (or other) criteria, the search results corresponding to the respective visual identifier include one or more of: product information, a product review, an option to initiate purchase of the product, an option to initiate a bid on the product, a list of similar products, and a list of related products.

Optionally, a respective user selectable link in the interactive results document includes anchor text, which is displayed in the document without having to activate the link. The anchor text provides information, such as a key word or term, related to the information obtained when the link is activated. Anchor text may be displayed as part of the label (307), or in a portion of a bounding box (304), or as additional information displayed when a user hovers a cursor over a user selectable link for a pre-determined period of time such as 1 second.

Optionally, a respective user selectable link in the interactive results document is a link to a search engine for searching for information or documents corresponding to a text-based query (sometimes herein called a term query). Activation of the link causes execution of the search by the search engine, where the query and the search engine are specified by the link (e.g., the search engine is specified by a URL in the link and the text-based search query is specified by a URL parameter of the link), with results returned to the client system. Optionally, the link in this example may include anchor text specifying the text or terms in the search query.

In some embodiments, the interactive results document produced in response to a visual query can include a plurality of links that correspond to results from the same search system. For example, a visual query may be an image or picture of a group of people. The interactive results document may include bounding boxes around each person, which when activated returns results from the facial recognition search system for each face in the group. For some visual queries, a plurality of links in the interactive results document corresponds to search results from more than one search system (310). For example, if a picture of a person and a dog was submitted as the visual query, bounding boxes in the interactive results document may outline the person and the dog separately. When the person (in the interactive results document) is selected, search results from the facial recognition search system are retuned, and when the dog (in the interactive results document) is selected, results from the image-to-terms search system are returned. For some visual queries, the interactive results document contains an OCR result and an image match result (312). For example, if a picture of a person standing next to a sign were submitted as a visual query, the interactive results document may include visual identifiers for the person and for the text in the sign. Similarly, if a scan of a magazine was used as the visual query, the interactive results document may include visual identifiers for photographs or trademarks in advertisements on the page as well as a visual identifier for the text of an article also on that page.

Figure 15:
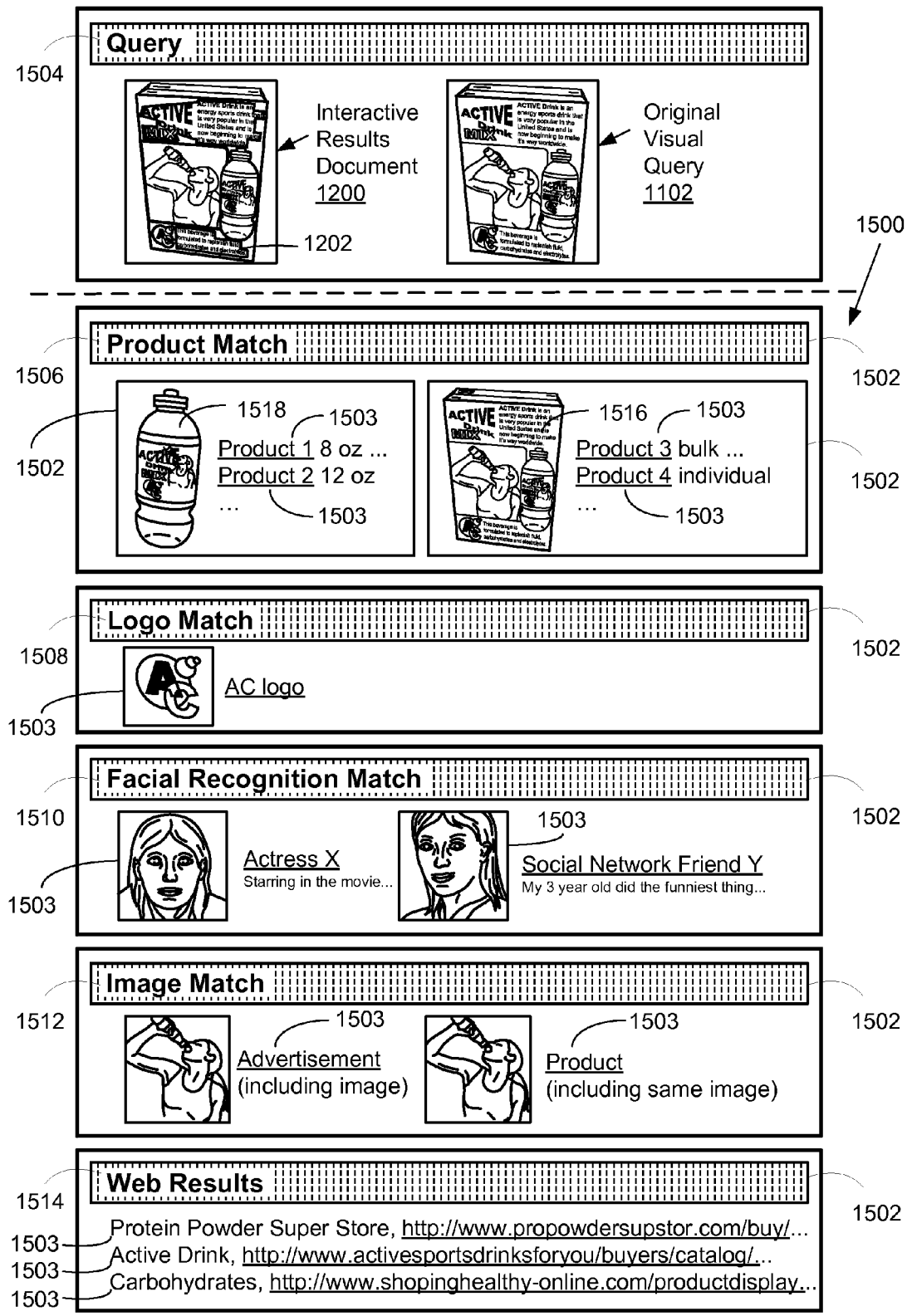
FIG. 15 illustrates a screen shot of an interactive results document and visual query displayed concurrently with a results list, in accordance with some embodiments.

After the interactive results document has been created, it is sent to the client system (314). In some embodiments, the interactive results document (e.g., document 1200, FIG. 15) is sent in conjunction with a list of search results from one or more parallel search systems, as discussed above with reference to FIG. 2. In some embodiments, the interactive results document is displayed at the client system above or otherwise adjacent to a list of search results from one or more parallel search systems (315) as shown in FIG. 15.

Optionally, the user will interact with the results document by selecting a visual identifier in the results document. The server system receives from the client system information regarding the user selection of a visual identifier in the interactive results document (316). As discussed above, in some embodiments, the link is activated by selecting an activation region inside a bounding box. In other embodiments, the link is activated by a user selection of a visual identifier of a sub-portion of the visual query, which is not a bounding box. In some embodiments, the linked visual identifier is a hot button, a label located near the sub-portion, an underlined word in text, or other representation of an object or subject in the visual query.

In embodiments where the search results list is presented with the interactive results document (315), when the user selects a user selectable link (316), the search result in the search results list corresponding to the selected link is identified. In some embodiments, the cursor will jump or automatically move to the first result corresponding to the selected link. In some embodiments in which the display of the client 102 is too small to display both the interactive results document and the entire search results list, selecting a link in the interactive results document causes the search results list to scroll or jump so as to display at least a first result corresponding to the selected link. In some other embodiments, in response to user selection of a link in the interactive results document, the results list is reordered such that the first result corresponding to the link is displayed at the top of the results list.

In some embodiments, when the user selects the user selectable link (316) the visual query server system sends at least a subset of the results, related to a corresponding sub-portion of the visual query, to the client for display to the user (318). In some embodiments, the user can select multiple visual identifiers concurrently and will receive a subset of results for all of the selected visual identifiers at the same time. In other embodiments, search results corresponding to the user selectable links are preloaded onto the client prior to user selection of any of the user selectable links so as to provide search results to the user virtually instantaneously in response to user selection of one or more links in the interactive results document.

Figure 4:
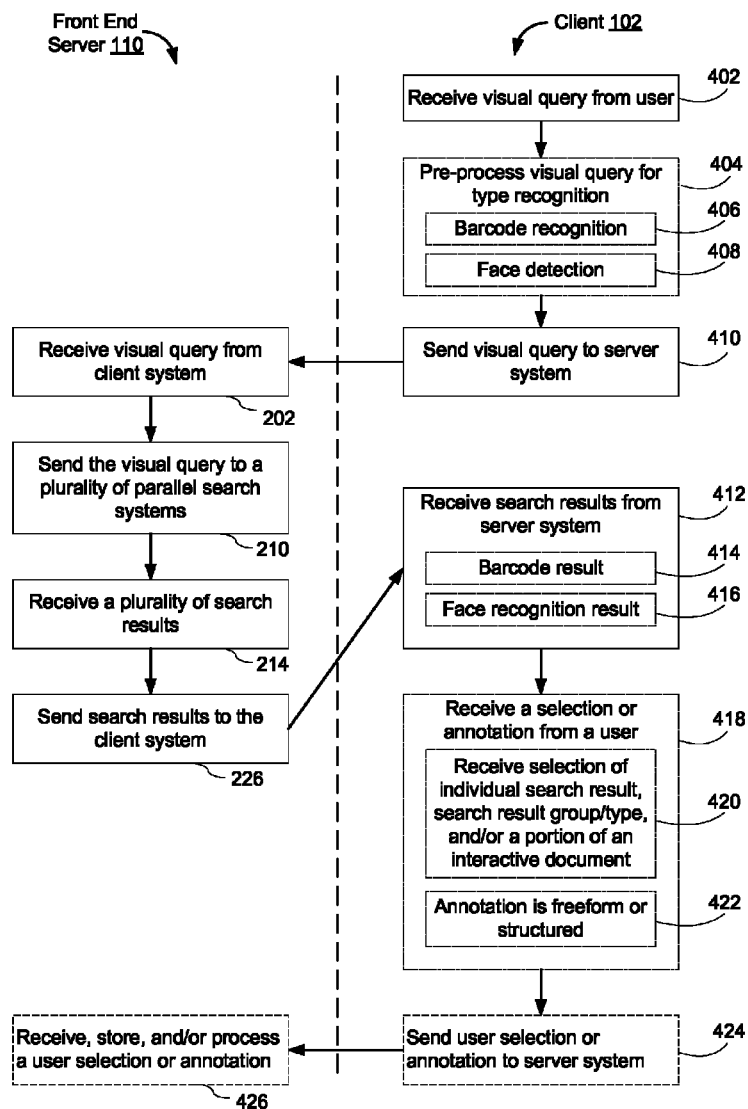
FIG. 4 is a flow diagram illustrating the communications between a client and a visual query server system, in accordance with some embodiments.

FIG. 4 is a flow diagram illustrating the communications between a client and a visual query server system. The client 102 receives a visual query from a user/querier (402). In some embodiments, visual queries can only be accepted from users who have signed up for or "opted in" to the visual query system. In some embodiments, searches for facial recognition matches are only performed for users who have signed up for the facial recognition visual query system, while other types of visual queries are performed for anyone regardless of whether they have "opted in" to the facial recognition portion.

As explained above, the format of the visual query can take many forms. The visual query will likely contain one or more subjects located in sub-portions of the visual query document. For some visual queries, the client system 102 performs type recognition pre-processing on the visual query (404). In some embodiments, the client system 102 searches for particular recognizable patterns in this pre-processing system. For example, for some visual queries the client may recognize colors. For some visual queries the client may recognize that a particular sub-portion is likely to contain text (because that area is made up of small dark characters surrounded by light space etc.) The client may contain any number of pre-processing type recognizers, or type recognition modules. In some embodiments, the client will have a type recognition module (barcode recognition 406) for recognizing bar codes. It may do so by recognizing the distinctive striped pattern in a rectangular area. In some embodiments, the client will have a type recognition module (face detection 408) for recognizing that a particular subject or sub-portion of the visual query is likely to contain a face.

In some embodiments, the recognized "type" is returned to the user for verification. For example, the client system 102 may return a message stating "a bar code has been found in your visual query, are you interested in receiving bar code query results?" In some embodiments, the message may even indicate the sub-portion of the visual query where the type has been found. In some embodiments, this presentation is similar to the interactive results document discussed with reference to FIG. 3. For example, it may outline a sub-portion of the visual query and indicate that the sub-portion is likely to contain a face, and ask the user if they are interested in receiving facial recognition results.

After the client 102 performs the optional pre-processing of the visual query, the client sends the visual query to the visual query server system 106, specifically to the front end visual query processing server 110. In some embodiments, if pre-processing produced relevant results, i.e., if one of the type recognition modules produced results above a certain threshold, indicating that the query or a sub-portion of the query is likely to be of a particular type (face, text, barcode etc.), the client will pass along information regarding the results of the pre-processing. For example, the client may indicate that the face recognition module is 75% sure that a particular sub-portion of the visual query contains a face. More generally, the pre-processing results, if any, include one or more subject type values (e.g., bar code, face, text, etc.). Optionally, the pre-processing results sent to the visual query server system include one or more of: for each subject type value in the pre-processing results, information identifying a sub-portion of the visual query corresponding to the subject type value, and for each subject type value in the pre-processing results, a confidence value indicating a level of confidence in the subject type value and/or the identification of a corresponding sub-portion of the visual query.

The front end server 110 receives the visual query from the client system (202). The visual query received may contain the pre-processing information discussed above. As described above, the front end server sends the visual query to a plurality of parallel search systems (210). If the front end server 110 received pre-processing information regarding the likelihood that a sub-portion contained a subject of a certain type, the front end server may pass this information along to one or more of the parallel search systems. For example, it may pass on the information that a particular sub-portion is likely to be a face so that the facial recognition search system 112-A can process that subsection of the visual query first. Similarly, sending the same information (that a particular sub-portion is likely to be a face) may be used by the other parallel search systems to ignore that sub-portion or analyze other sub-portions first. In some embodiments, the front end server will not pass on the pre-processing information to the parallel search systems, but will instead use this information to augment the way in which it processes the results received from the parallel search systems.

As explained with reference to FIG. 2, for at some visual queries, the front end server 110 receives a plurality of search results from the parallel search systems (214). The front end server may then perform a variety of ranking and filtering, and may create an interactive search result document as explained with reference to FIGS. 2 and 3. If the front end server 110 received pre-processing information regarding the likelihood that a sub-portion contained a subject of a certain type, it may filter and order by giving preference to those results that match the pre-processed recognized subject type. If the user indicated that a particular type of result was requested, the front end server will take the user's requests into account when processing the results. For example, the front end server may filter out all other results if the user only requested bar code information, or the front end server will list all results pertaining to the requested type prior to listing the other results. If an interactive visual query document is returned, the server may pre-search the links associated with the type of result the user indicated interest in, while only providing links for performing related searches for the other subjects indicated in the interactive results document. Then the front end server 110 sends the search results to the client system (226).

The client 102 receives the results from the server system (412). When applicable, these results will include the results that match the type of result found in the pre-processing stage. For example, in some embodiments they will include one or more bar code results (414) or one or more facial recognition results (416). If the client's pre-processing modules had indicated that a particular type of result was likely, and that result was found, the found results of that type will be listed prominently.

Optionally the user will select or annotate one or more of the results (418). The user may select one search result, may select a particular type of search result, and/or may select a portion of an interactive results document (420). Selection of a result is implicit feedback that the returned result was relevant to the query. Such feedback information can be utilized in future query processing operations. An annotation provides explicit feedback about the returned result that can also be utilized in future query processing operations. Annotations take the form of corrections of portions of the returned result (like a correction to a mis-OCRed word) or a separate annotation (either free form or structured.)

The user's selection of one search result, generally selecting the "correct" result from several of the same type (e.g., choosing the correct result from a facial recognition server), is a process that is referred to as a selection among interpretations. The user's selection of a particular type of search result, generally selecting the result "type" of interest from several different types of returned results (e.g., choosing the OCRed text of an article in a magazine rather than the visual results for the advertisements also on the same page), is a process that is referred to as disambiguation of intent. A user may similarly select particular linked words (such as recognized named entities) in an OCRed document as explained in detail with reference to FIG. 8.

The user may alternatively or additionally wish to annotate particular search results. This annotation may be done in freeform style or in a structured format (422). The annotations may be descriptions of the result or may be reviews of the result. For example, they may indicate the name of subject (s) in the result, or they could indicate "this is a good book" or "this product broke within a year of purchase." Another example of an annotation is a user-drawn bounding box around a sub-portion of the visual query and user-provided text identifying the object or subject inside the bounding box. User annotations are explained in more detail with reference to FIG. 5.

The user selections of search results and other annotations are sent to the server system (424). The front end server 110 receives the selections and annotations and further processes them (426). If the information was a selection of an object, sub-region or term in an interactive results document, further information regarding that selection may be requested, as appropriate. For example, if the selection was of one visual result, more information about that visual result would be requested. If the selection was a word (either from the OCR server or from the Image-to-Terms server) a textual search of that word would be sent to the term query server system 118. If the selection was of a person from a facial image recognition search system, that person's profile would be requested. If the selection was for a particular portion of an interactive search result document, the underlying visual query results would be requested.

If the server system receives an annotation, the annotation is stored in a query and annotation database 116, explained with reference to FIG. 5. Then the information from the annotation database 116 is periodically copied to individual annotation databases for one or more of the parallel server systems, as discussed below with reference to FIGS. 7-10.

Figure 5:
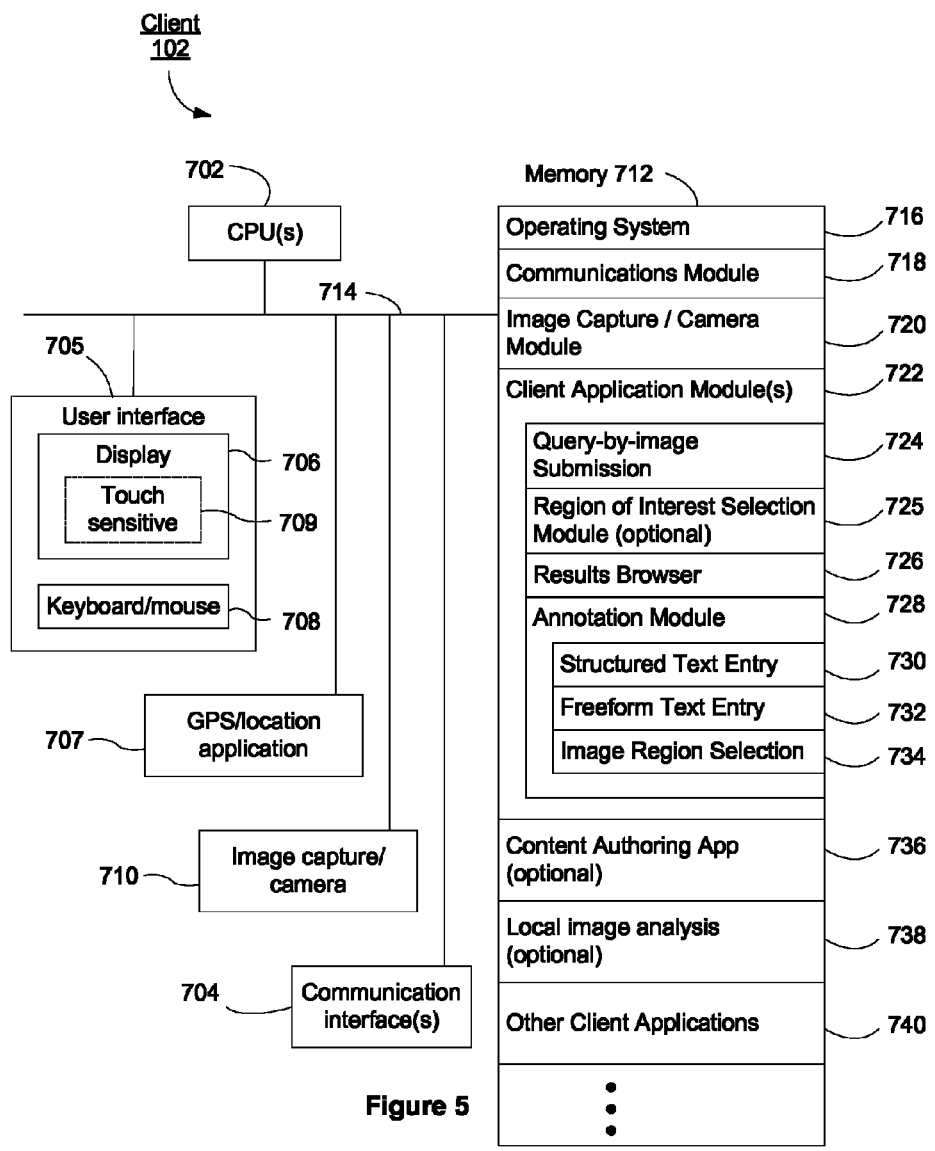
FIG. 5 is a block diagram illustrating a client system, in accordance with some embodiments.

FIG. 5 is a block diagram illustrating a client system 102 in accordance with one embodiment of the present invention. The client system 102 typically includes one or more processing units (CPU's) 702, one or more network or other communications interfaces 704, memory 712, and one or more communication buses 714 for interconnecting these components. The client system 102 includes a user interface 705. The user interface 705 includes a display device 706 and optionally includes an input means such as a keyboard, mouse, or other input buttons 708. Alternatively or in addition the display device 706 includes a touch sensitive surface 709, in which case the display 706/709 is a touch sensitive display. In client systems that have a touch sensitive display 706/709, a physical keyboard is optional (e.g., a soft keyboard may be displayed when keyboard entry is needed). Furthermore, some client systems use a microphone and voice recognition to supplement or replace the keyboard. Optionally, the client 102 includes a GPS (global positioning satellite) receiver, or other location detection apparatus 707 for determining the location of the client system 102. In some embodiments, visual query search services are provided that require the client system 102 to provide the visual query server system to receive location information indicating the location of the client system 102.

The client system 102 also includes an image capture device 710 such as a camera or scanner. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU (s) 702. Memory 712, or alternately the non-volatile memory device(s) within memory 712, comprises a non-transitory computer readable storage medium. In some embodiments, memory 712 or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the client system 102 to other computers via the one or more communication network interfaces 704 (wired or wireless) and one or more communication networks, such as the Internet, other wide area networks, local area networks, metropolitan area networks, and so on;
- a image capture module 720 for processing a respective image captured by the image capture device/camera 710, where the respective image may be sent (e.g., by a client application module) as a visual query to the visual query server system;
- one or more client application modules 722 for handling various aspects of querying by image, including but not limited to: a query-by-image submission module 724 for submitting visual queries to the visual query server system; optionally a region of interest selection module 725 that detects a selection (such as a gesture on the touch sensitive display 706/709) of a region of interest in an image and prepares that region of interest as a visual query; a results browser 726 for displaying the results of the visual query; and optionally an annotation module 728 with optional modules for structured annotation text entry 730 such as filling in a form or for freeform annotation text entry 732, which can accept annotations from a variety of formats, and an image region selection module 734 (sometimes referred to herein as a result selection module) which allows a user to select a particular sub-portion of an image for annotation;
- an optional content authoring application(s) 736 that allow a user to author a visual query by creating or editing an image rather than just capturing one via the image capture device 710; optionally, one or such applications 736 may include instructions that enable a user to select a sub-portion of an image for use as a visual query;
- an optional local image analysis module 738 that pre-processes the visual query before sending it to the visual query server system. The local image analysis may recognize particular types of images, or sub-regions within an image. Examples of image types that may be recognized by such modules 738 include one or more of: facial type (facial image recognized within visual query), bar code type (bar code recognized within visual query), and text type (text recognized within visual query); and
- additional optional client applications 740 such as an email application, a phone application, a browser application, a mapping application, instant messaging application, social networking application etc. In some embodiments, the application corresponding to an appropriate actionable search result can be launched or accessed when the actionable search result is selected.

Optionally, the image region selection module 734 which allows a user to select a particular sub-portion of an image for annotation, also allows the user to choose a search result as a "correct" hit without necessarily further annotating it. For example, the user may be presented with a top N number of facial recognition matches and may choose the correct person from that results list. For some search queries, more than one type of result will be presented, and the user will choose a type of result. For example, the image query may include a person standing next to a tree, but only the results regarding the person is of interest to the user. Therefore, the image selection module 734 allows the user to indicate which type of image is the "correct" type—i.e., the type he is interested in receiving. The user may also wish to annotate the search result by adding personal comments or descriptive words using either the annotation text entry module 730 (for filling in a form) or freeform annotation text entry module 732.

In some embodiments, the optional local image analysis module 738 is a portion of the client application (108, FIG. 1). Furthermore, in some embodiments the optional local image analysis module 738 includes one or more programs to perform local image analysis to pre-process or categorize the visual query or a portion thereof. For example, the client application 722 may recognize that the image contains a bar code, a face, or text, prior to submitting the visual query to a search engine. In some embodiments, when the local image analysis module 738 detects that the visual query contains a particular type of image, the module asks the user if they are interested in a corresponding type of search result. For example, the local image analysis module 738 may detect a face based on its general characteristics (i.e., without determining which person's face) and provides immediate feedback to the user prior to sending the query on to the visual query server system. It may return a result like, "A face has been detected, are you interested in getting facial recognition matches for this face?" This may save time for the visual query server system (106, FIG. 1). For some visual queries, the front end visual query processing server (110, FIG. 1) only sends the visual query to the search system 112 corresponding to the type of image recognized by the local image analysis module 738. In other embodiments, the visual query to the search system 112 may send the visual query to all of the search systems 112A-N, but will rank results from the search system 112 corresponding to the type of image recognized by the local image analysis module 738. In some embodiments, the manner in which local image analysis impacts on operation of the visual query server system depends on the configuration of the client system, or configuration or processing parameters associated with either the user or the client system. Furthermore, the actual content of any particular visual query and the results produced by the local image analysis may cause different visual queries to be handled differently at either or both the client system and the visual query server system.

In some embodiments, bar code recognition is performed in two steps, with analysis of whether the visual query includes a bar code performed on the client system at the local image analysis module 738. Then the visual query is passed to a bar code search system only if the client determines the visual query is likely to include a bar code. In other embodiments, the bar code search system processes every visual query.

Optionally, the client system 102 includes additional client applications 740.

Figure 6:
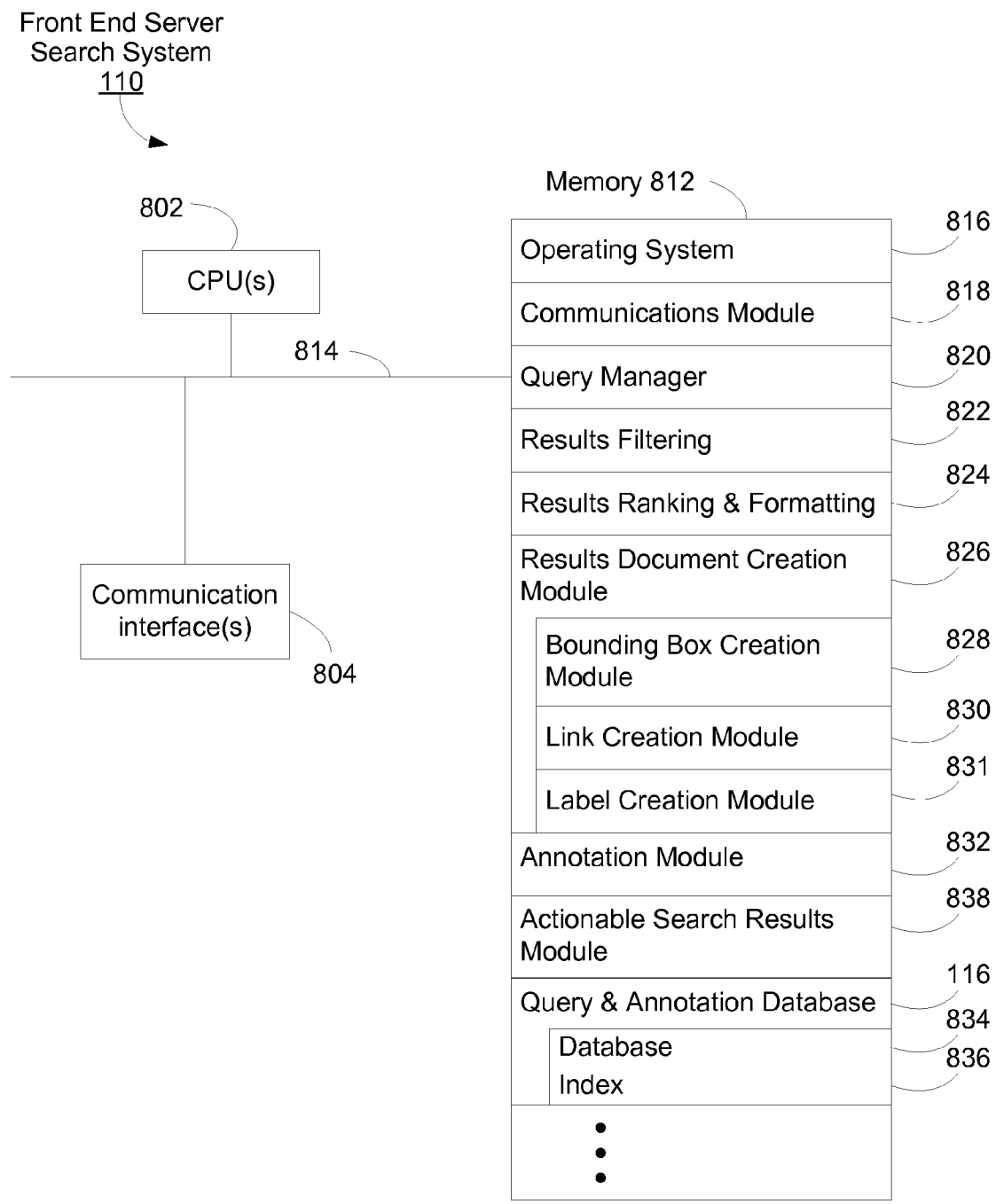
FIG. 6 is a block diagram illustrating a front end visual query processing server system, in accordance with some embodiments.

FIG. 6 is a block diagram illustrating a front end visual query processing server system 110 in accordance with one embodiment of the present invention. The front end server 110 typically includes one or more processing units (CPU's) 802, one or more network or other communications interfaces 804, memory 812, and one or more communication buses 814 for interconnecting these components. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, comprises a non-transitory computer readable storage medium. In some embodiments, memory 812 or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the front end server system 110 to other computers via the one or more communication network interfaces 804 (wired or wireless) and one or more communication networks, such as the Internet, other wide area networks, local area networks, metropolitan area networks, and so on;
- a query manager 820 for handling the incoming visual queries from the client system 102 and sending them to two or more parallel search systems; as described elsewhere in this document, in some special situations a visual query may be directed to just one of the search systems, such as when the visual query includes an client-generated instruction (e.g., "facial recognition search only");
- a results filtering module 822 for optionally filtering the results from the one or more parallel search systems and sending the top or "relevant" results to the client system 102 for presentation;
- a results ranking and formatting module 824 for optionally ranking the results from the one or more parallel search systems and for formatting the results for presentation;
- a results document creation module 826, is used when appropriate, to create an interactive search results document; module 826 may include sub-modules, including but not limited to a bounding box creation module 828 and a link creation module 830;
- a label creation module 831 for creating labels that are visual identifiers of respective sub-portions of a visual query;
- an annotation module 832 for receiving annotations from a user and sending them to an annotation database 116;
- an actionable search results module 838 for generating, in response to a visual query, one or more actionable search result elements, each configured to launch a client-side action; examples of actionable search result elements are buttons to initiate a telephone call, to initiate email message, to map an address, to make a restaurant reservation, and to provide an option to purchase a product; and
- a query and annotation database 116 which comprises the database itself 834 and an index to the database 836.

The results ranking and formatting module 824 ranks the results returned from the one or more parallel search systems (112-A-112-N, FIG. 1). As already noted above, for some visual queries, only the results from one search system may be relevant. In such an instance, only the relevant search results from that one search system are ranked. For some visual queries, several types of search results may be relevant. In these instances, in some embodiments, the results ranking and formatting module 824 ranks all of the results from the search system having the most relevant result (e.g., the result with the highest relevance score) above the results for the less relevant search systems. In other embodiments, the results ranking and formatting module 824 ranks a top result from each relevant search system above the remaining results. In some embodiments, the results ranking and formatting module 824 ranks the results in accordance with a relevance score computed for each of the search results. For some visual queries, augmented textual queries are performed in addition to the searching on parallel visual search systems. In some embodiments, when textual queries are also performed, their results are presented in a manner visually distinctive from the visual search system results.

The results ranking and formatting module 824 also formats the results. In some embodiments, the results are presented in a list format. In some embodiments, the results are presented by means of an interactive results document. In some embodiments, both an interactive results document and a list of results are presented. In some embodiments, the type of query dictates how the results are presented. For example, if more than one searchable subject is detected in the visual query, then an interactive results document is produced, while if only one searchable subject is detected the results will be displayed in list format only.

The results document creation module 826 is used to create an interactive search results document. The interactive search results document may have one or more detected and searched subjects. The bounding box creation module 828 creates a bounding box around one or more of the searched subjects. The bounding boxes may be rectangular boxes, or may outline the shape(s) of the subject(s). The link creation module 830 creates links to search results associated with their respective subject in the interactive search results document. In some embodiments, clicking within the bounding box area activates the corresponding link inserted by the link creation module.

The query and annotation database 116 contains information that can be used to improve visual query results. In some embodiments, the user may annotate the image after the visual query results have been presented. Furthermore, in some embodiments the user may annotate the image before sending it to the visual query search system. Pre-annotation may help the visual query processing by focusing the results, or running text based searches on the annotated words in parallel with the visual query searches. In some embodiments, annotated versions of a picture can be made public (e.g., when the user has given permission for publication, for example by designating the image and annotation(s) as not private), so as to be returned as a potential image match hit. For example, if a user takes a picture of a flower and annotates the image by giving detailed genus and species information about that flower, the user may want that image to be presented to anyone who performs a visual query research looking for that flower. In some embodiments, the information from the query and annotation database 116 is periodically pushed to the parallel search systems 112, which incorporate relevant portions of the information (if any) into their respective individual databases 114.

Figure 7:
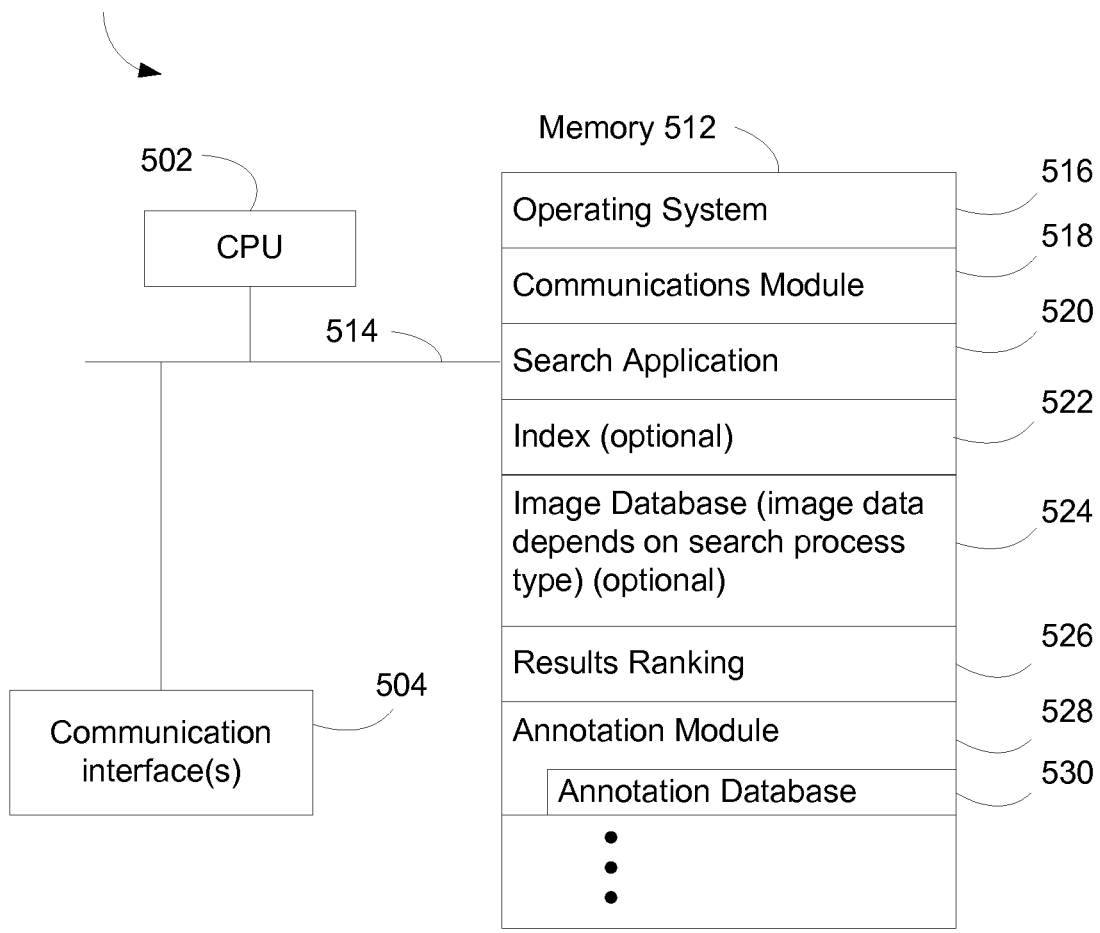
FIG. 7 is a block diagram illustrating a generic one of the parallel search systems utilized to process a visual query, in accordance with some embodiments.

FIG. 7 is a block diagram illustrating one of the parallel search systems utilized to process a visual query. FIG. 7 illustrates a "generic" server system 112-N in accordance with one embodiment of the present invention. This server system is generic only in that it represents any one of the visual query search servers 112-N. The generic server system 112-N typically includes one or more processing units (CPU's) 502, one or more network or other communications interfaces 504, memory 512, and one or more communication buses 514 for interconnecting these components. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternately the non-volatile memory device(s) within memory 512, comprises a non-transitory computer readable storage medium. In some embodiments, memory 512 or the computer readable storage medium of memory 512 stores the following programs, modules and data structures, or a subset thereof:

- an operating system 516 that includes procedures for handling various basic system services and for performing hardware dependent tasks;
- a network communication module 518 that is used for connecting the generic server system 112-N to other computers via the one or more communication network interfaces 504 (wired or wireless) and one or more communication networks, such as the Internet, other wide area networks, local area networks, metropolitan area networks, and so on;
- a search application 520 specific to the particular server system, it may for example be a bar code search application, a color recognition search application, a product recognition search application, an object-or-object category search application, or the like;
- an optional index 522 if the particular search application utilizes an index;
- an optional image database 524 for storing the images relevant to the particular search application, where the image data stored, if any, depends on the search process type;
- an optional results ranking module 526 (sometimes called a relevance scoring module) for ranking the results from the search application, the ranking module may assign a relevancy score for each result from the search application, and if no results reach a pre-defined minimum score, may return a null or zero value score to the front end visual query processing server indicating that the results from this server system are not relevant; and
- an annotation module 528 for receiving annotation information from an annotation database (116, FIG. 1) determining if any of the annotation information is relevant to the particular search application and incorporating any determined relevant portions of the annotation information into the respective annotation database 530.

Figure 8:
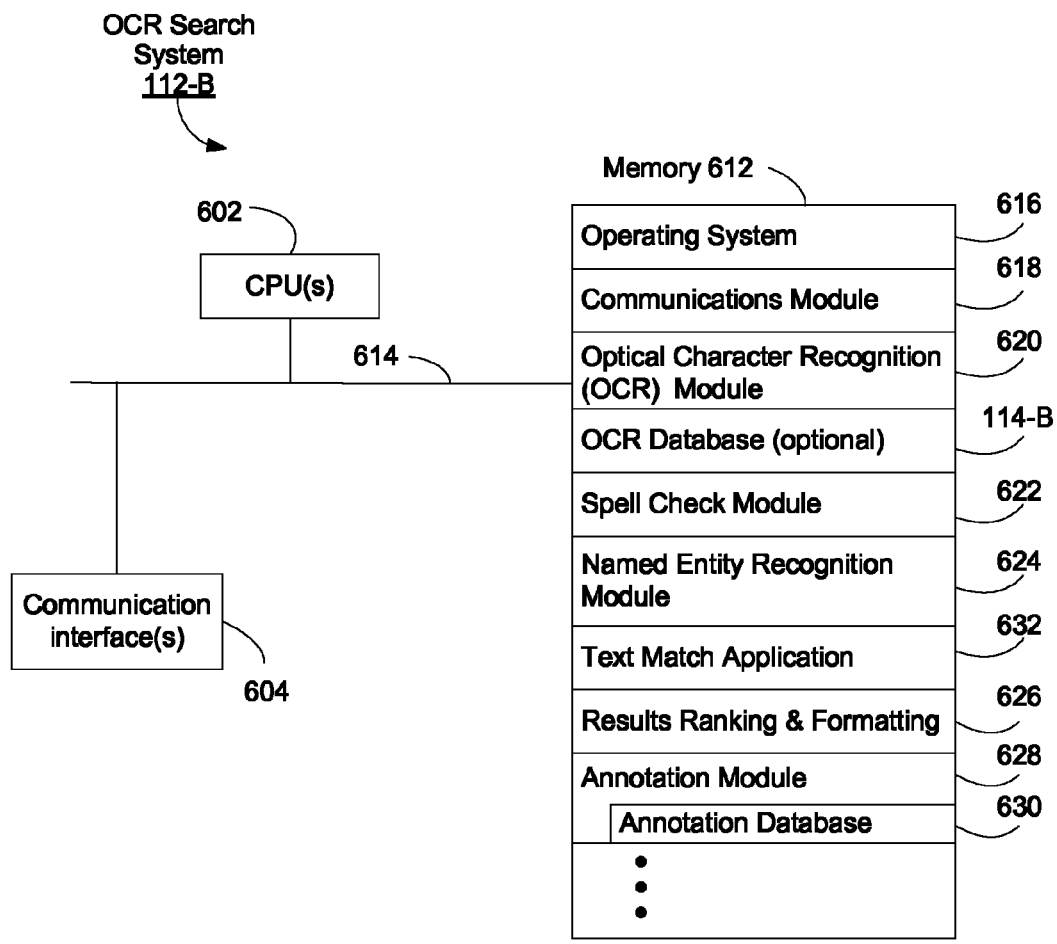
FIG. 8 is a block diagram illustrating an OCR search system utilized to process a visual query, in accordance with some embodiments.

FIG. 8 is a block diagram illustrating an OCR search system 112-B utilized to process a visual query in accordance with one embodiment of the present invention. The OCR search system 112-B typically includes one or more processing units (CPU's) 602, one or more network or other communications interfaces 604, memory 612, and one or more communication buses 614 for interconnecting these components. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612 or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the OCR search system 112-B to other computers via the one or more communication network interfaces 604 (wired or wireless) and one or more communication networks, such as the Internet, other wide area networks, local area networks, metropolitan area networks, and so on;
- an Optical Character Recognition (OCR) module 620 which tries to recognize text in the visual query, and converts the images of letters into characters;
- an optional OCR database 114-B which is utilized by the OCR module 620 to recognize particular fonts, text patterns, and other characteristics unique to letter recognition;

an optional spell check module 622 which improves the conversion of images of letters into characters by checking the converted words against a dictionary and replacing potentially mis-converted letters in words that otherwise match a dictionary word;

an optional named entity recognition module 624 which searches for named entities within the converted text, sends the recognized named entities as terms in a term query to the term query server system (118, FIG. 1), and provides the results from the term query server system as links embedded in the OCRed text associated with the recognized named entities;

an optional text match application 632 which improves the conversion of images of letters into characters by checking converted segments (such as converted sentences and paragraphs) against a database of text segments and replacing potentially mis-converted letters in OCRed text segments that otherwise match a text match application text segment, in some embodiments the text segment found by the text match application is provided as a link to the user (for example, if the user scanned one page of the New York Times, the text match application may provide a link to the entire posted article on the New York Times website);

a results ranking and formatting module 626 for formatting the OCRed results for presentation and formatting optional links to named entities, and also optionally ranking any related results from the text match application; and an optional annotation module 628 for receiving annotation information from an annotation database (116, FIG. 1) determining if any of the annotation information is relevant to the OCR search system and incorporating any determined relevant portions of the annotation information into the respective annotation database 630.

Figure 9:
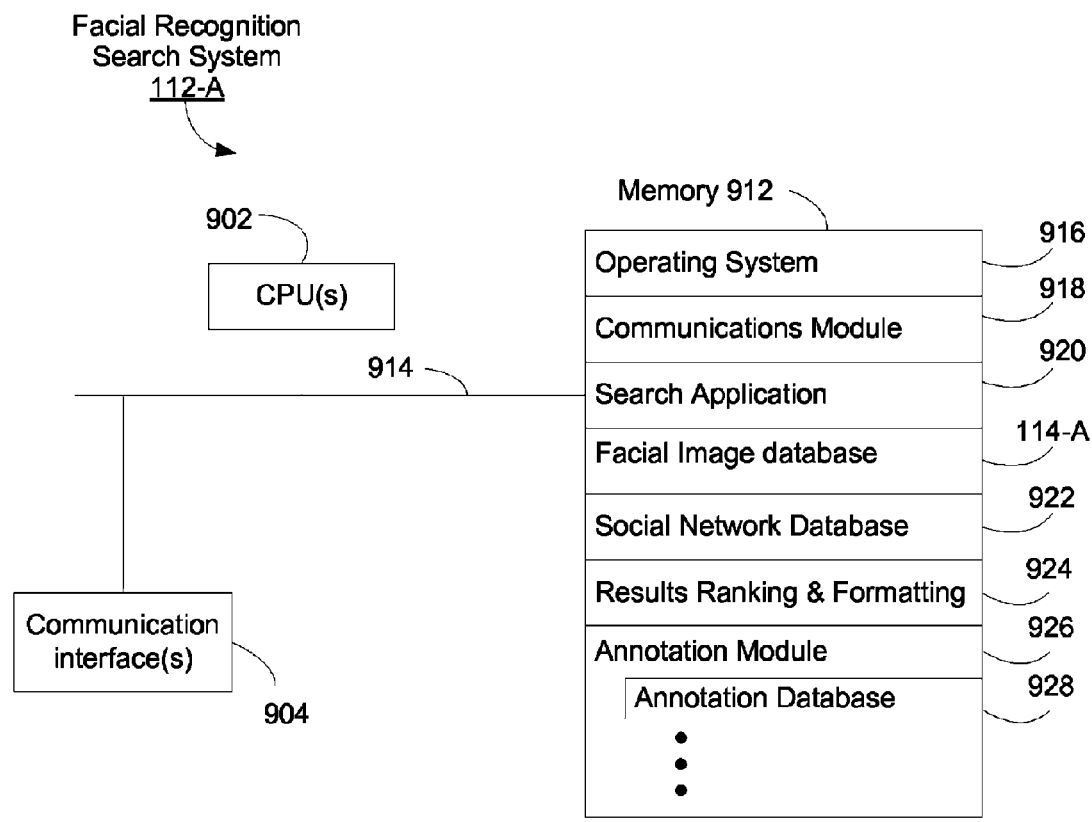
FIG. 9 is a block diagram illustrating a facial recognition search system utilized to process a visual query, in accordance with some embodiments.

FIG. 9 is a block diagram illustrating a facial recognition search system 112-A utilized to process a visual query in accordance with one embodiment of the present invention. The facial recognition search system 112-A typically includes one or more processing units (CPU's) 902, one or more network or other communications interfaces 904, memory 912, and one or more communication buses 914 for interconnecting these components. Memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 912 may optionally include one or more storage devices remotely located from the CPU (s) 902. Memory 912, or alternately the non-volatile memory device(s) within memory 912, comprises a non-transitory computer readable storage medium. In some embodiments, memory 912 or the computer readable storage medium of memory 912 stores the following programs, modules and data structures, or a subset thereof:

an operating system 916 that includes procedures for handling various basic system services and for performing hardware dependent tasks;

a network communication module 918 that is used for connecting the facial recognition search system 112-A to other computers via the one or more communication network interfaces 904 (wired or wireless) and one or more communication networks, such as the Internet, other wide area networks, local area networks, metropolitan area networks, and so on;

a facial recognition search application 920 for searching for facial images matching the face(s) presented in the visual query in a facial image database 114-A and searches the social network database 922 for information regarding each match found in the facial image database 114-A.

a facial image database 114-A for storing one or more facial images for a plurality of users; optionally, the facial image database includes facial images for people other than users, such as family members and others known by users and who have been identified as being present in images included in the facial image database 114-A; optionally, the facial image database includes facial images obtained from external sources, such as vendors of facial images that are legally in the public domain;

optionally, a social network database 922 which contains information regarding users of the social network such as name, address, occupation, group memberships, social network connections, current GPS location of mobile device, share preferences, interests, age, hometown, personal statistics, work information, etc. as discussed in more detail with reference to FIG. 12A;

a results ranking and formatting module 924 for ranking (e.g., assigning a relevance and/or match quality score to) the potential facial matches from the facial image database 114-A and formatting the results for presentation; in some embodiments, the ranking or scoring of results utilizes related information retrieved from the aforementioned social network database; in some embodiment, the search formatted results include the potential image matches as well as a subset of information from the social network database; and an annotation module 926 for receiving annotation information from an annotation database (116, FIG. 1) determining if any of the annotation information is relevant to the facial recognition search system and storing any determined relevant portions of the annotation information into the respective annotation database 928.

Figure 10:
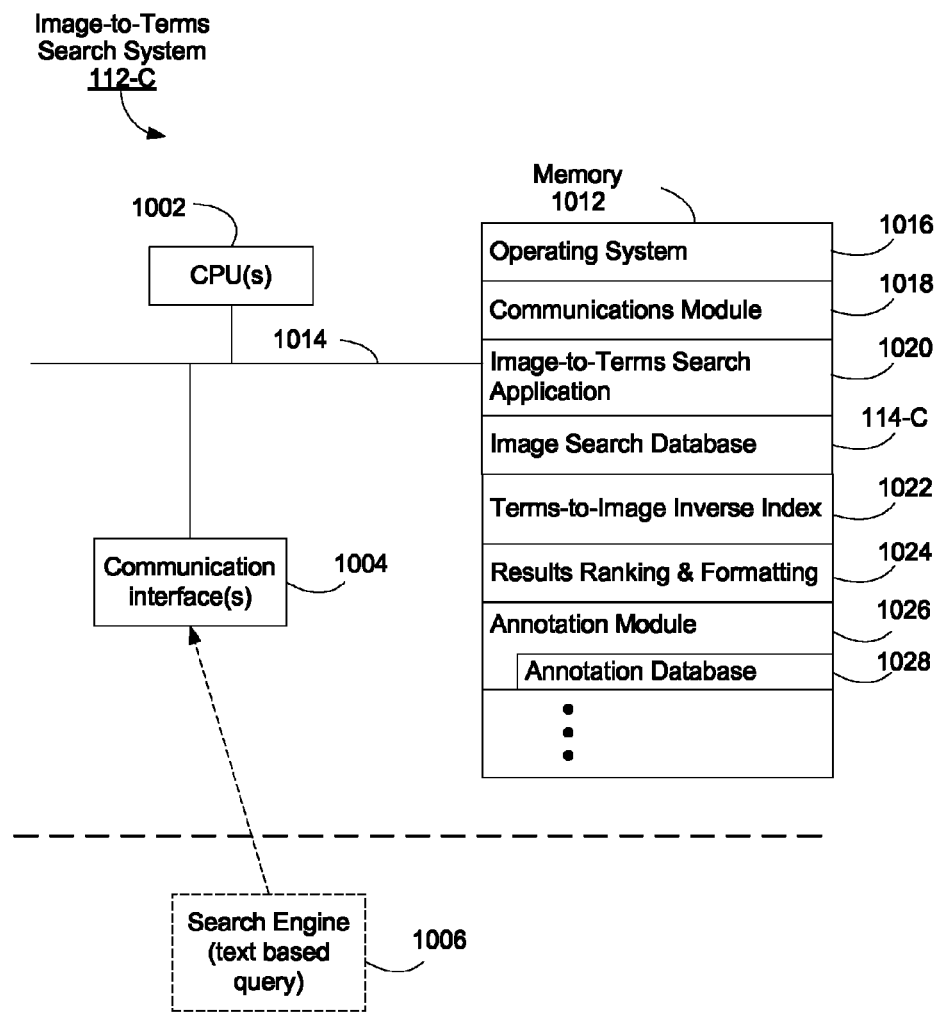
FIG. 10 is a block diagram illustrating an image to terms search system utilized to process a visual query, in accordance with some embodiments.

FIG. 10 is a block diagram illustrating an image-to-terms search system 112-C utilized to process a visual query in accordance with one embodiment of the present invention. In some embodiments, the image-to-terms search system recognizes objects (instance recognition) in the visual query. In other embodiments, the image-to-terms search system recognizes object categories (type recognition) in the visual query. In some embodiments, the image to terms system recognizes both objects and object-categories. The image-to-terms search system returns potential term matches for images in the visual query. The image-to-terms search system 112-C typically includes one or more processing units (CPU's) 1002, one or more network or other communications interfaces 1004, memory 1012, and one or more communication buses 1014 for interconnecting these components. Memory 1012 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1012 may optionally include one or more storage devices remotely located from the CPU(s) 1002. Memory 1012, or alternately the non-volatile memory device(s) within memory 1012, comprises a non-transitory computer readable storage medium. In some embodiments, memory 1012 or the computer readable storage medium of memory 1012 stores the following programs, modules and data structures, or a subset thereof:

- an operating system 1016 that includes procedures for handling various basic system services and for performing hardware dependent tasks;
- a network communication module 1018 that is used for connecting the image-to-terms search system 112-C to other computers via the one or more communication network interfaces 1004 (wired or wireless) and one or more communication networks, such as the Internet, other wide area networks, local area networks, metropolitan area networks, and so on;
- a image-to-terms search application 1020 that searches for images matching the subject or subjects in the visual query in the image search database 114-C;
- an image search database 114-C which can be searched by the search application 1020 to find images similar to the subject(s) of the visual query;
- a terms-to-image inverse index 1022, which stores the textual terms used by users when searching for images using a text based query search engine 1006;
- a results ranking and formatting module 1024 for ranking the potential image matches and/or ranking terms associated with the potential image matches identified in the terms-to-image inverse index 1022; and
- an annotation module 1026 for receiving annotation information from an annotation database (116, FIG. 1) determining if any of the annotation information is relevant to the image-to terms search system 112-C and storing any determined relevant portions of the annotation information into the respective annotation database 1028.

FIGS. 5-10 are intended more as functional descriptions of the various features which may be present in a set of computer systems than as a structural schematic of the embodiments described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement visual query processing and how features are allocated among them will vary from one implementation to another.

Each of the methods described herein may be governed by instructions that are stored in a non-transitory computer readable storage medium and that are executed by one or more processors of one or more servers or clients. The above identified modules or programs (i.e., sets of instructions) need not be implemented as separate software programs, procedures or modules, and thus various subsets of these modules may be combined or otherwise re-arranged in various embodiments. Each of the operations shown in FIGS. 5-10 may correspond to instructions stored in a computer memory or non-transitory computer readable storage medium.

FIG. 11 illustrates a client system 102 with a screen shot of an exemplary visual query 1102. The client system 102 shown in FIG. 11 is a mobile device such as a cellular telephone, portable music player, or portable emailing device. The client system 102 includes a display 706 and one or more input means 708 such the buttons shown in this figure. In some embodiments, the display 706 is a touch sensitive display 709. In embodiments having a touch sensitive display 709, soft buttons displayed on the display 709 may optionally replace some or all of the electromechanical buttons 708. Touch sensitive displays are also helpful in interacting with the visual query results as explained in more detail below. The client system 102 also includes an image capture mechanism such as a camera 710.

FIG. 11 illustrates a visual query 1102 which is a photograph or video frame of a package on a shelf of a store. In the embodiments described here, the visual query is a two dimensional image having a resolution corresponding to the size of the visual query in pixels in each of two dimensions. The visual query 1102 in this example is a two dimensional image of three dimensional objects. The visual query 1102 includes background elements, a product package 1104, and a variety of types of entities on the package including an image of a person 1106, an image of a trademark 1108, an image of a product 1110, and a variety of textual elements 1112.

As explained with reference to FIG. 3, the visual query 1102 is sent to the front end server 110, which sends the visual query 1102 to a plurality of parallel search systems (112A-N), receives the results and creates an interactive results document.

FIGS. 12A and 12B each illustrate a client system 102 with a screen shot of an embodiment of an interactive results document 1200. The interactive results document 1200 includes one or more visual identifiers 1202 of respective sub-portions of the visual query 1102, which each include a user selectable link to a subset of search results. FIGS. 12A and 12B illustrate an interactive results document 1200 with visual identifiers that are bounding boxes 1202 (e.g., bounding boxes 1202-1, 1202-2, 1202-3). In the embodiments shown in FIGS. 12A and 12B, the user activates the display of the search results corresponding to a particular sub-portion by tapping on the activation region inside the space outlined by its bounding box 1202. For example, the user would activate the search results corresponding to the image of the person, by tapping on a bounding box 1306 (FIG. 13) surrounding the image of the person. In other embodiments, the selectable link is selected using a mouse or keyboard rather than a touch sensitive display. In some embodiments, the first corresponding search result is displayed when a user previews a bounding box 1202 (i.e., when the user single clicks, taps once, or hovers a pointer over the bounding box). The user activates the display of a plurality of corresponding search results when the user selects the bounding box (i.e., when the user double clicks, taps twice, or uses another mechanism to indicate selection.)

In FIGS. 12A and 12B the visual identifiers are bounding boxes 1202 surrounding sub-portions of the visual query. FIG. 12A illustrates bounding boxes 1202 that are square or rectangular. FIG. 12B illustrates a bounding box 1202 that outlines the boundary of an identifiable entity in the sub-portion of the visual query, such as the bounding box 1202-3 for a drink bottle. In some embodiments, a respective bounding box 1202 includes smaller bounding boxes 1202 within it. For example, in FIGS. 12A and 12B, the bounding box identifying the package 1202-1 surrounds the bounding box identifying the trademark 1202-2 and all of the other bounding boxes 1202. In some embodiments that include text, also include active hot links 1204 for some of the textual terms. FIG. 12B shows an example where "Active Drink" and "United States" are displayed as hot links 1204. The search results corresponding to these terms are the results received from the term query server system 118, whereas the results corresponding to the bounding boxes are results from the query by image search systems.

FIG. 13 illustrates a client system 102 with a screen shot of an interactive results document 1200 that is coded by type of recognized entity in the visual query. The visual query of FIG. 11 contains an image of a person 1106, an image of a trademark 1108, an image of a product 1110, and a variety of textual elements 1112. As such the interactive results document 1200 displayed in FIG. 13 includes bounding boxes 1202 around a person 1306, a trademark 1308, a product 1310, and the two textual areas 1312. The bounding boxes of FIG. 13 are each presented with separate cross-hatching which represents differently colored transparent bounding boxes 1202. In some embodiments, the visual identifiers of the bounding boxes (and/or labels or other visual identifiers in the interactive results document 1200) are formatted for presentation in visually distinctive manners such as overlay color, overlay pattern, label background color, label background pattern, label font color, and bounding box border color. The type coding for particular recognized entities is shown with respect to bounding boxes in FIG. 13, but coding by type can also be applied to visual identifiers that are labels.

FIG. 14 illustrates a client device 102 with a screen shot of an interactive results document 1200 with labels 1402 being the visual identifiers of respective sub-portions of the visual query 1102 of FIG. 11. The label visual identifiers 1402 each include a user selectable link to a subset of corresponding search results. In some embodiments, the selectable link is identified by descriptive text displayed within the area of the label 1402. Some embodiments include a plurality of links within one label 1402. For example, in FIG. 14, the label hovering over the image of a woman drinking includes a link to facial recognition results for the woman and a link to image recognition results for that particular picture (e.g., images of other products or advertisements using the same picture.)

In FIG. 14, the labels 1402 are displayed as partially transparent areas with text that are located over their respective sub-portions of the interactive results document. In other embodiments, a respective label is positioned near but not located over its respective sub-portion of the interactive results document. In some embodiments, the labels are coded by type in the same manner as discussed with reference to FIG. 13. In some embodiments, the user activates the display of the search results corresponding to a particular sub-portion corresponding to a label 1302 by tapping on the activation region inside the space outlined by the edges or periphery of the label 1302. The same previewing and selection functions discussed above with reference to the bounding boxes of FIGS. 12A and 12B also apply to the visual identifiers that are labels 1402.

FIG. 15 illustrates a screen shot of an interactive results document 1200 and the original visual query 1102 displayed concurrently with a results list 1500. In some embodiments, the interactive results document 1200 is displayed by itself as shown in FIGS. 12-14. In other embodiments, the interactive results document 1200 is displayed concurrently with the original visual query as shown in FIG. 15. In some embodiments, the list of visual query results 1500 is concurrently displayed along with the original visual query 1102 and/or the interactive results document 1200. The type of client system and the amount of room on the display 706 may determine whether the list of results 1500 is displayed concurrently with the interactive results document 1200. In some embodiments, the client system 102 receives (in response to a visual query submitted to the visual query server system) both the list of results 1500 and the interactive results document 1200, but only displays the list of results 1500 when the user scrolls below the interactive results document 1200. In some of these embodiments, the client system 102 displays the results corresponding to a user selected visual identifier 1202/1402 without needing to query the server again because the list of results 1500 is received by the client system 102 in response to the visual query and then stored locally at the client system 102.

In some embodiments, the list of results 1500 is organized into categories 1502. Each category contains at least one result 1503. In some embodiments, the categories titles are highlighted to distinguish them from the results 1503. The categories 1502 are ordered according to their calculated category weight. In some embodiments, the category weight is a combination of the weights of the highest N results in that category. As such, the category that has likely produced more relevant results is displayed first. In embodiments where more than one category 1502 is returned for the same recognized entity (such as the facial image recognition match and the image match shown in FIG. 15) the category displayed first has a higher category weight.

As explained with respect to FIG. 3, in some embodiments, when a selectable link in the interactive results document 1200 is selected by a user of the client system 102, the cursor will automatically move to the appropriate category 1502 or to the first result 1503 in that category. Alternatively, when a selectable link in the interactive results document is selected by a user of the client system 102, the list of results 1500 is re-ordered such that the category or categories relevant to the selected link are displayed first. This is accomplished, for example, by either coding the selectable links with information identifying the corresponding search results, or by coding the search results to indicate the corresponding selectable links or to indicate the corresponding result categories.

In some embodiments, the categories of the search results correspond to the query-by-image search system that produce those search results. For example, in FIG. 15 some of the categories are product match 1506, logo match 1508, facial recognition match 1510, image match 1512. The original visual query 1102 and/or an interactive results document 1200 may be similarly displayed with a category title such as the query 1504. Similarly, results from any term search performed by the term query server may also be displayed as a separate category, such as web results 1514. In other embodiments, more than one entity in a visual query will produce results from the same query-by-image search system. For example, the visual query could include two different faces that would return separate results from the facial recognition search system. As such, in some embodiments, the categories 1502 are divided by recognized entity rather than by search system. In some embodiments, an image of the recognized entity is displayed in the recognized entity category header 1502 such that the results for that recognized entity are distinguishable from the results for another recognized entity, even though both results are produced by the same query by image search system. For example, in FIG. 15, the product match category 1506 includes two entity product entities and as such as two entity categories 1502—a boxed product 1516 and a bottled product 1518, each of which have a plurality of corresponding search results 1503. In some embodiments, the categories may be divided by recognized entities and type of query-by-image system. For example, in FIG. 15, there are two separate entities that returned relevant results under the product match category product.

In some embodiments, the results 1503 include thumbnail images. For example, as shown for the facial recognition match results in FIG. 15, small versions (also called thumbnail images) of the pictures of the facial matches for "Actress X" and "Social Network Friend Y" are displayed along with some textual description such as the name of the person in the image.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
    obtaining, from each of at least first and second image search components to which a query image is submitted, a set of resources that the image search component identifies as matching the query image based on applying the query image to an image-based search process that is specific to the image search component;
    selecting (i) a particular resource that the first image search component identifies as matching the query image, and (ii) a particular resource that the second image search component identifies as matching the query image;
    determining (i) a region of the query image that is associated with the particular resource that the first image search component identifies as matching the query image, and (ii) a region of the query image that is associated with the particular resource that the second image search component identifies as matching the query image; and
    generating an image search results page that includes, (i) in a first region of the search results page that is associated with the first image search component, a first interactive-search result that includes a thumbnail image associated with the region of the query image that is determined to be associated with the particular resource that the first image search component identifies as matching the query image, wherein the first interactive-search result is linked to the particular resource that the first image search component identifies as matching the query image, (ii) in a different, second region of the search results page that is associated with the second image search component, a second interactive-search result that includes a thumbnail image associated with the region of the query image that is determined to be associated with the particular resource that the second image search component identifies as matching the query image, wherein the second interactive-search result is linked to the particular resource that the second image search component identifies as matching the query image, and (iii) a third region of the search results page that is associated with the query image.

2. The computer-implemented method of claim 1, wherein the region of the query image that is determined to be associated with the particular resource that the first image search component identifies as matching the query image includes a bounding box that outlines a boundary of an identifiable entity in a sub-portion of the query image.

3. The computer-implemented method of claim 2, wherein the bounding box is associated with an activation region of a user selectable link, the user selectable link associated with one or more search results corresponding to the sub-portion of the query image.

4. The computer-implemented method of claim 2, further comprising:
    identifying a type of the identifiable entity in the sub-portion of the query image; and
    formatting a visual display of the bounding box based on the identified type of the identifiable entity in the sub-portion of the query image.

5. The computer-implemented method of claim 1, wherein the region of the query image that is determined to be associated with the particular resource that the first image search component includes a textual element, the method further comprising:
    obtaining, from a term query search component, an additional set of resources based on the textual element; and
    augmenting the image search result page to include the additional set of resources.

6. The computer-implemented method of claim 1, wherein the region of the query image that is determined to be associated with the particular resource that the first image search component includes a facial image, the method further comprising:
    identifying one or more attributes associated with a person matching the facial image; and
    augmenting the image search results page to include the one or more attributes associated with the person matching the facial image.

7. The computer-implemented method of claim 1, wherein generating the image search results page further includes:
    generating the image search result page to include a search results list associated with (i) the particular resource that the first image search component identifies as matching the query image and (ii) the particular resource that the second image search component identifies as matching the query image;
    receiving a selection of a user selectable link associated with one of (i) the particular resource that the first image search component identifies as matching the query image and (ii) the particular resource that the second image search component identifies as matching the query image; and
    identifying a search result of the search results list corresponding to the selection of the user selectable link.

8. The computer-implemented method of claim 1, further comprising:
    receiving a selection of a user selectable link associated with one of (i) the particular resource that the first image search component identifies as matching the query image and (ii) the particular resource that the second image search component identifies as matching the query image; and
    based on the selection of the user selectable link, providing a subset of search results that are associated with one of (i) the particular resource that the first image search component identifies as matching the query image and (ii) the particular resource that the first image search component identifies as matching the query image.

9. The computer-implemented method of claim 1, wherein the first image search component and the second image search component are substantially the same.

10. The computer-implemented method of claim 1, wherein the first image search component and the second image search component differ.

11. A system comprising:
    one or more computers and one or more storage devices storing instructions that are operable, when executed by the one or more computers, to cause the one or more computers to perform operations comprising:
        obtaining, from each of at least first and second image search components to which a query image is submitted, a set of resources that the image search component identifies as matching the query image based on applying the query image to an image-based search process that is specific to the image search component;

selecting (i) a particular resource that the first image search component identifies as matching the query image, and (ii) a particular resource that the second image search component identifies as matching the query image;

determining (i) a region of the query image that is associated with the particular resource that the first image search component identifies as matching the query image, and (ii) a region of the query image that is associated with the particular resource that the second image search component identifies as matching the query image; and generating an image search results page that includes, (i) in a first region of the search results page that is associated with the first image search component, a first interactive-search result that includes a thumbnail image associated with the region of the query image that is determined to be associated with the particular resource that the first image search component identifies as matching the query image, wherein the first interactive-search result is linked to the particular resource that the first image search component identifies as matching the query image, (ii) in a different second region of the search results page that is associated with the second image search component, a second interactive-search result that includes a thumbnail image associated with the region of the query image that is determined to be associated with the particular resource that the second image search component identifies as matching the query image, wherein the second interactive-search result is linked to the particular resource that the second image search component identifies as matching the query image, and (iii) a third region of the search results page that is associated with the query image.

12. The system of claim 11, wherein the region of the query image that is determined to be associated with the particular resource that the first image search component identifies as matching the query image includes a bounding box that outlines a boundary of an identifiable entity in a sub-portion of the query image.

13. The system of claim 12, wherein the bounding box is associated with an activation region of a user selectable link, the user selectable link associated with one or more search results corresponding to the sub-portion of the query image.

14. The system of claim 12, the operations further comprising:
identifying a type of the identifiable entity in the sub-portion of the query image; and
formatting a visual display of the bounding box based on the identified type of the identifiable entity in the sub-portion of the query image.

15. The system of claim 11, wherein the region of the query image that is determined to be associated with the particular resource that the first image search component includes a textual element, the method further comprising:
obtaining, from a term query search component, an additional set of resources based on the textual element; and
augmenting the image search result page to include the additional set of resources.

16. The system of claim 11, wherein the region of the query image that is determined to be associated with the particular resource that the first image search component includes a facial image, the method further comprising:

identifying one or more attributes associated with a person matching the facial image; and
augmenting the image search results page to include the one or more attributes associated with the person matching the facial image.

17. The system of claim 11, wherein generating the image search results page further includes:
generating the image search result page to include a search results list associated with (i) the particular resource that the first image search component identifies as matching the query image and (ii) the particular resource that the second image search component identifies as matching the query image;
receiving a selection of a user selectable link associated with one of (i) the particular resource that the first image search component identifies as matching the query image and (ii) the particular resource that the second image search component identifies as matching the query image; and
identifying a search result of the search results list corresponding to the selection of the user selectable link.

18. A non-transitory computer-readable medium storing software comprising instructions executable by one or more computers which, upon such execution, cause the one or more computers to perform operations comprising:
obtaining, from each of at least first and second image search components to which a query image is submitted, a set of resources that the image search component identifies as matching the query image based on applying the query image to an image-based search process that is specific to the image search component;
selecting (i) a particular resource that the first image search component identifies as matching the query image, and (ii) a particular resource that the second image search component identifies as matching the query image;
determining (i) a region of the query image that is associated with the particular resource that the first image search component identifies as matching the query image, and (ii) a region of the query image that is associated with the particular resource that the second image search component identifies as matching the query image; and
generating an image search results page that includes, (i) in a first region of the search results page that is associated with the first image search component, a first interactive-search result that includes a thumbnail image associated with the region of the query image that is determined to be associated with the particular resource that the first image search component identifies as matching the query image, wherein the first interactive-search result is linked to the particular resource that the first image search component identifies as matching the query image, (ii) in a different, second region of the search results page that is associated with the second image search component, a second interactive-search result that includes a thumbnail image associated with the region of the query image that is determined to be associated with the particular resource that the second image search component identifies as matching the query image, wherein the second interactive-search result is linked to the particular resource that the second image search component identifies as matching the query image, and (iii) a third region of the search results page that is associated with the query image.

19. The non-transitory computer-readable medium of claim 18, wherein the region of the query image that is determined to be associated with the particular resource that the first image search component identifies as matching the query image includes a bounding box that outlines a boundary of an identifiable entity in a sub-portion of the query image.

20. The non-transitory computer-readable medium of claim 19, wherein the bounding box is associated with an activation region of a user selectable link, the user selectable link associated with one or more search results corresponding to the sub-portion of the query image.

\* \* \* \* \*